(12) United States Patent
Smith et al.

(10) Patent No.: US 12,195,201 B2
(45) Date of Patent: Jan. 14, 2025

(54) COMPOSITE PREFORM ASSEMBLY METHOD AND APPARATUS

(71) Applicant: The Boeing Company, Chicago, IL (US)

(72) Inventors: Daniel R. Smith, Mill Creek, WA (US); Jeremy Evan Justice, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 32 days.

(21) Appl. No.: 17/454,287

(22) Filed: Nov. 10, 2021

(65) Prior Publication Data

US 2022/0153444 A1 May 19, 2022

Related U.S. Application Data

(60) Provisional application No. 63/115,047, filed on Nov. 18, 2020.

(51) Int. Cl.
*B29C 70/30* (2006.01)
*B29C 70/38* (2006.01)
(Continued)

(52) U.S. Cl.
CPC .............. *B64F 5/10* (2017.01); *B29C 70/302* (2021.05); *B29C 70/38* (2013.01); *B29C 70/541* (2013.01);
(Continued)

(58) Field of Classification Search
CPC ... B29C 70/541; B29C 70/545; B29C 70/543; B29C 70/302; B29C 70/38
See application file for complete search history.

(56) References Cited

U.S. PATENT DOCUMENTS 4,491,493 A * 1/1985 Eaton .................... B29C 70/545
156/235
6,131,973 A * 10/2000 Trudeau ............... B65G 47/917
294/186

(Continued)

FOREIGN PATENT DOCUMENTS

EP 3106280 A1 12/2016
EP 3406431 A1 11/2018
(Continued)

OTHER PUBLICATIONS

Lindback, J.E., A. Bjornsson, K. Johansen, New Automated Composite Manufacturing Process: Is it possible to find a cost effective manufacturing method with the use of robotic equipment?, Proceedings of the 5th International Swedish Production Symposium (2012), pp. 523-531. (Year: 2012).*

(Continued)

*Primary Examiner* — Matthew J Daniels
(74) *Attorney, Agent, or Firm* — Yee & Associates, P.C.

(57) ABSTRACT

A method for fabricating a preform for a portion of an aircraft includes acquiring a sheet of broad good fiber reinforced material, trimming the sheet to form layup pieces having boundaries, placing the boundaries into alignment, arranging the layup pieces in a layup pattern to form a ply, performing a placement operation that transports the layup pattern onto a layup mandrel, and shaping the layup pattern into conformance with a contour of the layup mandrel.

20 Claims, 26 Drawing Sheets

(51) Int. Cl.
    *B29C 70/54*     (2006.01)
    *B64C 3/26*     (2006.01)
    *B64F 5/10*     (2017.01)
    *B29L 31/30*     (2006.01)

(52) U.S. Cl.
    CPC .............. *B29C 70/545* (2013.01); *B64C 3/26* (2013.01); *B29L 2031/3085* (2013.01)

(56) References Cited

U.S. PATENT DOCUMENTS

| | | | |
|---|---|---|---|
| 8,752,293 B2* | 6/2014 | Jones | B29C 70/304 156/196 |
| 2004/0026025 A1* | 2/2004 | Sana | B29C 70/545 156/523 |
| 2004/0051214 A1* | 3/2004 | Sheu | B29C 70/443 264/511 |
| 2006/0180270 A1* | 8/2006 | Ledet | B29C 70/545 156/250 |
| 2009/0148647 A1 | 6/2009 | Jones et al. | |
| 2011/0143100 A1* | 6/2011 | Levers | B29C 70/342 156/382 |
| 2014/0367037 A1 | 12/2014 | Metschan et al. | |
| 2018/0222060 A1 | 8/2018 | Petrovski et al. | |

FOREIGN PATENT DOCUMENTS

| | | |
|---|---|---|
| WO | 2015152331 A1 | 8/2015 |
| WO | 2017005770 A1 | 12/2017 |

OTHER PUBLICATIONS

European Patent Office Extended Search Report, dated Mar. 24, 2022, regarding Application No. EP21207367.0, 12 pages.
Netherlands Patent Office Written Opinion and Search Report with English Translation, dated Jun. 11, 2021, regarding Application No. NL2027397, 11 pages.
Buckingham et al., "Automating the Manufacture of Composite Broadgoods", Composites Part A, vol. 27A, No. 3, 1996, Elsevier Science Limited, 10 pages.
"Glossary of Terms", Composites, ASM International, vol. 21, Dec. 2001, 13 pages.
European Patent Office Communication, dated May 23, 2023, regarding Application No. EP21207367.0, 5 pages.

* cited by examiner

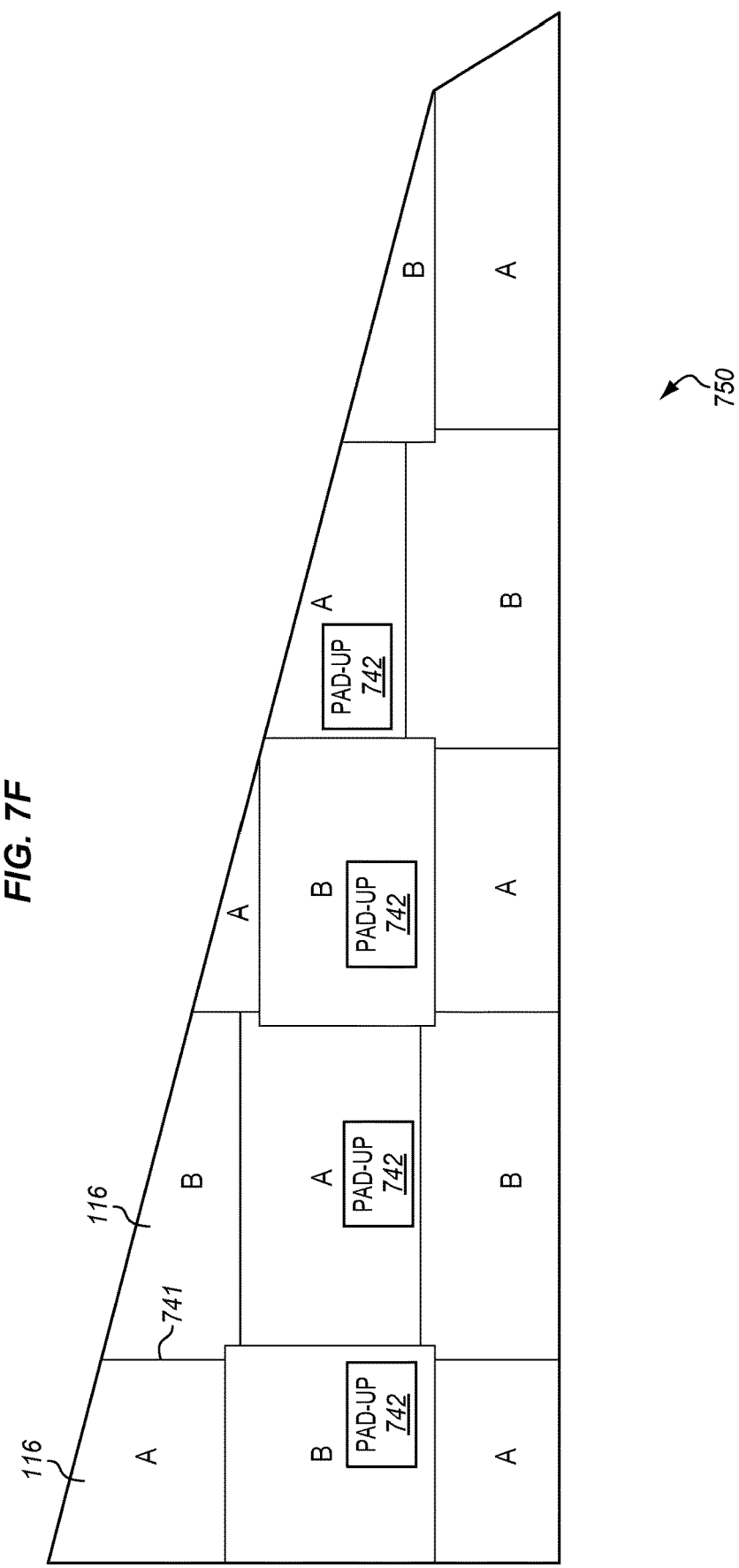

COMPOSITE PREFORM ASSEMBLY METHOD AND APPARATUS

CROSS-REFERENCE TO RELATED APPLICATION

This application claims the benefit of U.S. Provisional Patent Application Ser. No. 63/115,047, filed Nov. 18, 2020, and entitled "Composite Preform Assembly Method and Apparatus;" which is incorporated herein by reference in its entirety.

BACKGROUND INFORMATION

1. Field

The disclosure relates to the field of fabrication, and in particular, to fabrication of aircraft.

2. Background

The mechanical structure of an aircraft is referred to as an airframe. The airframe itself is made from discrete components such as stringers, spars, skins, and frames which, when assembled together, define the structure of the aircraft. An individual aircraft may be fabricated from many components. Presently, airframe components are fabricated via methods that include labor intensive hand-layup processes, or by moving an Automated Fiber Placement (AFP) machine which utilizes a single head to perform layup while traversing the contour of the airframe component to be fabricated. The airframe components remain in a stationary cell while this work is performed.

Therefore, it would be desirable to have a method and apparatus that take into account at least some of the issues discussed above, as well as other possible issues.

SUMMARY

Embodiments described herein provide for assembly line fabrication of airframe components using fiber reinforced broad goods. The broad goods are cut, rotated, and delivered via multiple stations synchronously in order to rapidly prepare a layup pattern (comprising one or more plies) corresponding with a wing skin, fuselage skin, etc. The layup pattern is then picked up, placed, and compacted onto a layup mandrel. After a sufficient number of layup patterns have been applied, the resulting preform is hardened into a composite part.

Disclosed is a method for fabricating a preform for a portion of an aircraft. The method includes acquiring a sheet of broad good fiber reinforced material, trimming the sheet to form layup pieces having boundaries, placing the boundaries into alignment, arranging the layup pieces in a layup pattern to form a ply, performing a placement operation that transports the layup pattern onto a layup mandrel, and shaping the layup pattern into conformance with a contour of the layup mandrel.

Also disclosed is a system for fabricating a preform for a portion of an aircraft. The system includes a broad goods station that acquires a sheet of broad good fiber reinforced material, and that trims the sheet to form a plurality of layup pieces having boundaries, a rotary table that places the boundaries into alignment, a shuttle that holds layup pieces from the rotary table in a layup pattern, and a shuttle that transports the layup pattern onto a layup mandrel, and that shapes the layup pattern into conformance with a contour of the layup mandrel.

Also disclosed is a method for fabricating a preform for a composite structure of an aircraft. The method includes dividing a composite structure into zones, fabricating a layup piece for each of the zones, arranging the layup pieces into a layup pattern, transporting the layup pattern to a layup mandrel via a carrier, and compacting the layup pattern onto the layup mandrel.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

BRIEF DESCRIPTION OF THE DRAWINGS

Some embodiments of the present disclosure are now described, by way of example only, and with reference to the accompanying drawings. The same reference number represents the same element or the same type of element on all drawings.

FIGS. 7E-7F depict layup patterns in illustrative embodiments.

DETAILED DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Composite parts, such as Carbon Fiber Reinforced Polymer (CFRP) parts, are initially laid-up in multiple layers that together are referred to as a preform. Individual fibers within each layer of the preform are aligned parallel with each other, but different layers exhibit different fiber orientations in order to increase the strength of the resulting composite part along different dimensions. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to hardening. For thermoset resins, the hardening is a one-way process referred to as curing, while for thermoplastic resins, the resin reaches a viscous form if it is re-heated, after which it can be consolidated to a desired shape and solidified. As used herein, the umbrella term for the process of transitioning a preform to a final hardened shape (i.e., transitioning a preform into a composite part) is referred to as "hardening," and this term encompasses both the curing of thermoset preforms and the forming/solidifying of thermoplastic preforms into a final desired shape.

Figure 1:
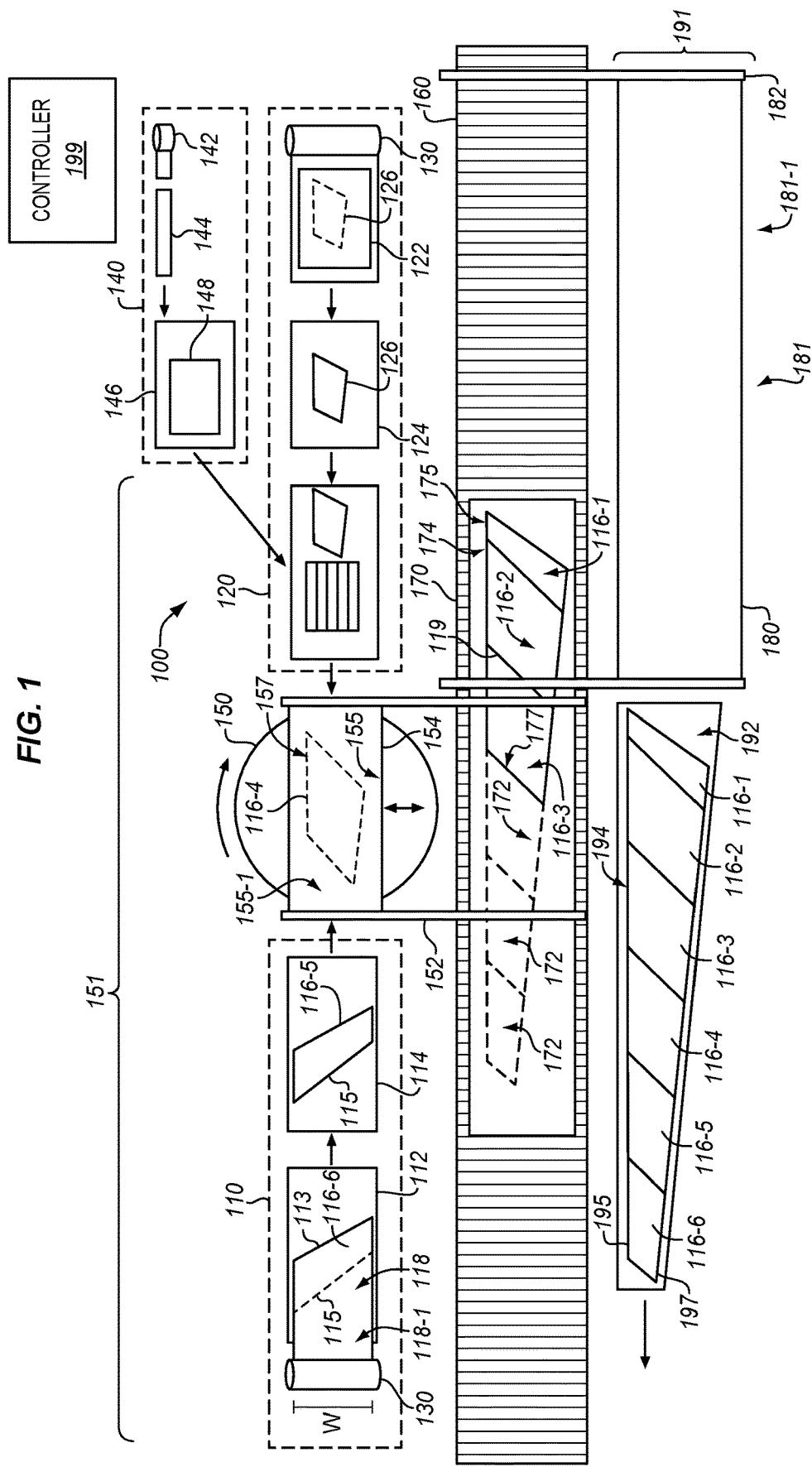
FIGS. 1-7 illustrate an assembly line for fabricating an airframe component from broad goods in an illustrative embodiment.

FIGS. 1-7 illustrate an assembly line 100 for fabricating an airframe component from broad goods in an illustrative embodiment. In FIG. 1, the assembly line 100 is depicted as including a broad goods station 110, which trims/cuts out layup pieces 116-1 through 116-6 (collectively referred to as "layup pieces 116") from a roll 130 of fiber reinforced broad goods material having a common width W. That is, the broad goods station 110 acquires a sheet 118 of broad good fiber reinforced material 118-1, and trims the sheet 118 (e.g., applies cuts to the sheet 118) to form a plurality of layup pieces 116-1 through 116-6 (also referred to collectively as "layup pieces 116").

The sheet 118 of broad goods material from which the layup pieces 116 are trimmed may comprise a series of continuous fibers that proceed along the length of the roll 130. By trimming pieces from the sheet 118 and rotating the pieces to desired angles (e.g., leading edge and trailing edge angles of a wing), layup pieces 116 for a variety of fiber angles are created.

In this embodiment, a first straight cut 113 for a layup piece 116-1 through 116-6 is made by a first cutting station 112 from a sheet 118 of broad good fiber reinforced material 118-1. While six layup pieces 116-1 through 116-6 are shown, embodiments may have more or fewer layup pieces (116). The number of layup pieces 116 may vary from ply 175 to ply 175. A second cutting station 114 makes a second straight cut 115 for the layup piece 116, without the need to rotate the layup piece 116. Layup pieces 116 are advanced to a rotary table 150, or other orienting station, where they are rotated into an alignment 157 with placement locations 172 at a shuttle 170. The rotary table 150 rotates the plurality of layup pieces 116.

Boundaries 119 shared between adjoined layup pieces 116 are oriented by the rotary table 150 to the same angle (i.e., resulting in a butt with no gaps or overlaps). In one embodiment, the broad goods station 110 trims the sheet 118 to cause the layup pieces 116 to exhibit a shared leading edge 195 angle and shared trailing edge 197 angle, and the rotary table 150 rotates the layup pieces 116 by orienting leading edges 195 of the layup pieces (116) to a common angle. Similarly, in another embodiment, the broad goods station 110 trims the sheet 118 to cause the layup pieces 116 to exhibit a shared leading edge 195 angle and shared trailing edge 197 angle, and the rotary table 150 rotates the layup pieces 116 by orienting trailing edge 197 of the layup pieces (116) to a common angle.

The layup pieces 116 are arranged by assembly line 100 into a layup pattern 174 for a preform 194. For example, the layup pieces 116-1 through 116-6 are capable of being arranged into a layup pattern 174 wherein boundaries 119 of the layup pieces 116 are complementary to each other (i.e., align with each other without gaps or overlaps). A layup pattern 174 may comprise one or more plies 175 formed from the layup pieces 116. Phrased another way, disparate layup pieces 116 are arranged into one or more plies 175 such that when subsequent plies 175 are added, the layup pieces 116 form a preform 194.

Layup patterns 174 are placed together to form a preform 194. When fully fabricated, the preform 194 includes multiple layup patterns 174 and/or individually shaped layup pieces 116. Between adjacent plies 175, and/or between adjoined layup patterns 174, staggered splices 177 are formed. These staggered splices 177 enhance a resilience of the preform 194 after it has been hardened. The splices 177 may comprise butt, lap and/or scarf splices.

Stated another way, the layup pieces 116 and layup patterns 174 are formed at disparate locations and carried to a preform 194 and/or layup mandrel 190, where these elements are butted/spliced to adjoined elements to contribute to the preform 194. Multiple plies 175 are formed iteratively in this manner with staggered splices 177 until the preform 194 is fully formed, resulting in a form of zonal lamination. Thus, in one embodiment placement operations at the assembly line 100 form staggered splices 177 between layup pieces 116 of the layup pattern 174 and layup pieces 116 of another layup pattern 174 disposed at the layup mandrel 190.

As discussed above, in this embodiment, the layup pieces 116 extend from a leading edge 195 to a trailing edge 197 of the preform 194. However, such an arrangement is not universally required. In one embodiment, the layup pieces 116-1 through 116-6 do not coincide with the leading edge 195 or trailing edge 197, and butt against adjoined layup pieces 116-1 through 116-6. In such an arrangement, the layup pieces 116-1 through 116-6 for a layup pattern 174 are not just placed side by side, but are also placed such that they form a pattern that extends forward and backward, such as leading edge 195 or trailing edge 197 or vice versa, as well as spanwise from a root at inboard end to a tip at outboard end.

The operations discussed above provide input for a feeder line 191 for fabricating a wing skin (e.g., wing skin 900 of FIG. 9) at a mandrel 190. In one embodiment, placement of the layup pieces 116 and the layup patterns 174 is provided in a Just In Time (JIT) manner to the feeder line 191, such that layup patterns 174 are received in a short period of time such as within seconds or less than a minute of feeder line 191 being ready to receive a next layup pattern.

In this embodiment, in addition to broad goods station 110, the assembly line 100 includes a small-piece station 120 and a tow-piece station 140. Depending on embodiment and design, small-piece station 120 or tow-piece station 140 are capable of providing different amounts of material for a wing, and either can provide a majority of material for a wing, fuselage section, or other composite structure. The small-piece station 120 operates a dynamic cutter station 122 (e.g., utilizing a laser cutter, or mobile blade that operates in accordance with a Numerical Control (NC) program, a technician with hand tools, etc.) to trim and/or cut out a layup piece 126 from a roll 130 of broad goods material for placement onto table 124. No dimension of the layup piece 126 equals the width of the roll 130, and thus, the layup piece 126 cannot be fabricated from two straight cuts across the width of the roll 130. Dynamic cutter station 122 accommodates layup pieces of this geometry via automated or hand layup techniques. Tow-piece station 140 fabricates layup pieces 148 from multiple tows 144 of fiber reinforced material stored on rolls 142, by dispensing the tows 144 onto table 146. Rolls 142 are cut to length and then kitted onto table 146, and then may be transferred (e.g., manually or automatically) to small-piece station 120.

Layup pieces 116-1 through 116-6, 126, and/or 148 are transported from the rotary table 150 to a shuttle 170 via a carrier 154 that slidably moves along a frame 152. The carrier 154 operates as a placement station 155, such as an automatic Pick and Place (PNP) station, assisted station, or manual station, and may comprise, for example, a polycarbonate resin thermoplastic film (e.g., a LEXAN™ brand polycarbonate film), or other flexible material 155-1 that conforms to the layup piece 116 while applying vacuum to controllably hold the layup piece 116 against it. The use of vacuum/suction for picking and placement may be performed in any suitable manner already known to those of ordinary skill in the art.

The shuttle 170 holds layup pieces from the rotary table 150 in a layup pattern 174. When all layup pieces 116 for a layup pattern 174 have been laid-up, the shuttle 170 is driven along a track 160. The layup pattern 174 forms a shape of a portion of a composite part (such as wing skin 900 of FIG. 9), being fabricated. For example, a layup pattern 174 can form a shape of a wing skin (such as wing skin 900 of FIG. 9) or a shape of a fuselage skin (e.g., fuselage skin 1852 of FIG. 18). In one embodiment, the layup pattern 174 comprises multiple plies of the fiber reinforced material.

A layup pattern 174 can be implemented as a single layer or single ply sequence for a preform that will be hardened into a composite part, or any number of non-overlapping ply sequences defined for the preform. In one embodiment, a technician or automated system then removes a backing from the layup pattern 174. In further embodiments, subsequent layers are added in the fashion described above before proceeding to additional operations.

Any of the operations discussed herein may be implemented in a micro pulsed fashion wherein components are advanced by less than their length and then paused, in a full pulsed fashion wherein components are advanced by at least their length and then paused, or in a continuously moving fashion. In one embodiment, multiple sheets 118 of broad goods are used to form a layup piece 116-1 through 116-6 that spans from a leading edge to the trailing edge. Thus, in some embodiments each layup pattern 174 includes multiple rows of layup pieces 116-1 through 116-6.

The layup pattern 174 is transferred from the shuttle 170 to a layup mandrel 190 via a carrier 180 mounted to a frame 182, and the layup pattern 174 is compacted into place. The carrier 180 may be operated in a similar fashion to carrier 154. In one embodiment, the carrier 180 therefore operates as a Pick and Place (PNP) machine that transports the layup pattern 174 onto a layup mandrel 190 (FIG. 4), and that shapes the layup pattern 174 into conformance with a contour 192 of the layup mandrel 190. In one embodiment, shaping the layup pattern comprises applying vacuum to (e.g., a load needed to form) the layup pattern 174 via a placement station 181-1 (e.g., a PNP station 181) comprising the carrier 180 and frame 182.

In a further embodiment, the sheet 118 is pulsed and paused to periodically advance through the assembly line 100. The stations of assembly line 100 perform work synchronously during pauses wherein the layup pieces 116 remain stationary, and refrain from performing work synchronously during pulses wherein the layup pieces 116 are moved.

In further embodiments, additional carriers 154 and 180 are utilized to place ply stacks for components such as a spar land area or a rib land area for wing skins, door and window surrounds, aft pad-ups, and other separately onto the layup mandrel 190 and to compact those components into place.

After a sufficient number of layup patterns 174 (e.g., multiple layup patterns for each of multiple fiber orientations) have been placed and compacted onto the contour 192 of the layup mandrel 190, a preform 194 has been completed. The layup mandrel 190 then exits the assembly line 100 to receive additional processing. A new layup mandrel 190 then takes the place of the previous layup mandrel 190. In one embodiment, each layup mandrel 190 includes an identifier (e.g., a Radio Frequency Identifier (RFID) chip, a barcode, etc. 190-1 in FIG. 4) indicating the type of composite part that the layup mandrel 190 is intended for. By reading this identifier, a controller of the assembly line 100 can confirm that the layup mandrel 190 matches an expected design.

A controller 199 operates the various components described above, often synchronously, to fabricate preforms 194 for composite parts in a rapid and effective manner. In one embodiment, controller 199 is implemented as custom circuitry, as a hardware processor executing programmed instructions stored in memory, or some combination thereof.

In still further embodiments, assembly line 100 utilizes broad goods of the same or similar size to fabricate preforms for a variety of parts, and a variety of models of aircraft. For example, assembly line 100 can be adapted to form preforms for wing skins, spars, stringers, fuselage skins, etc. In such embodiments, the specific carriers used may be swapped out for carriers that are adapted to the specific product being fabricated.

Figure 2:
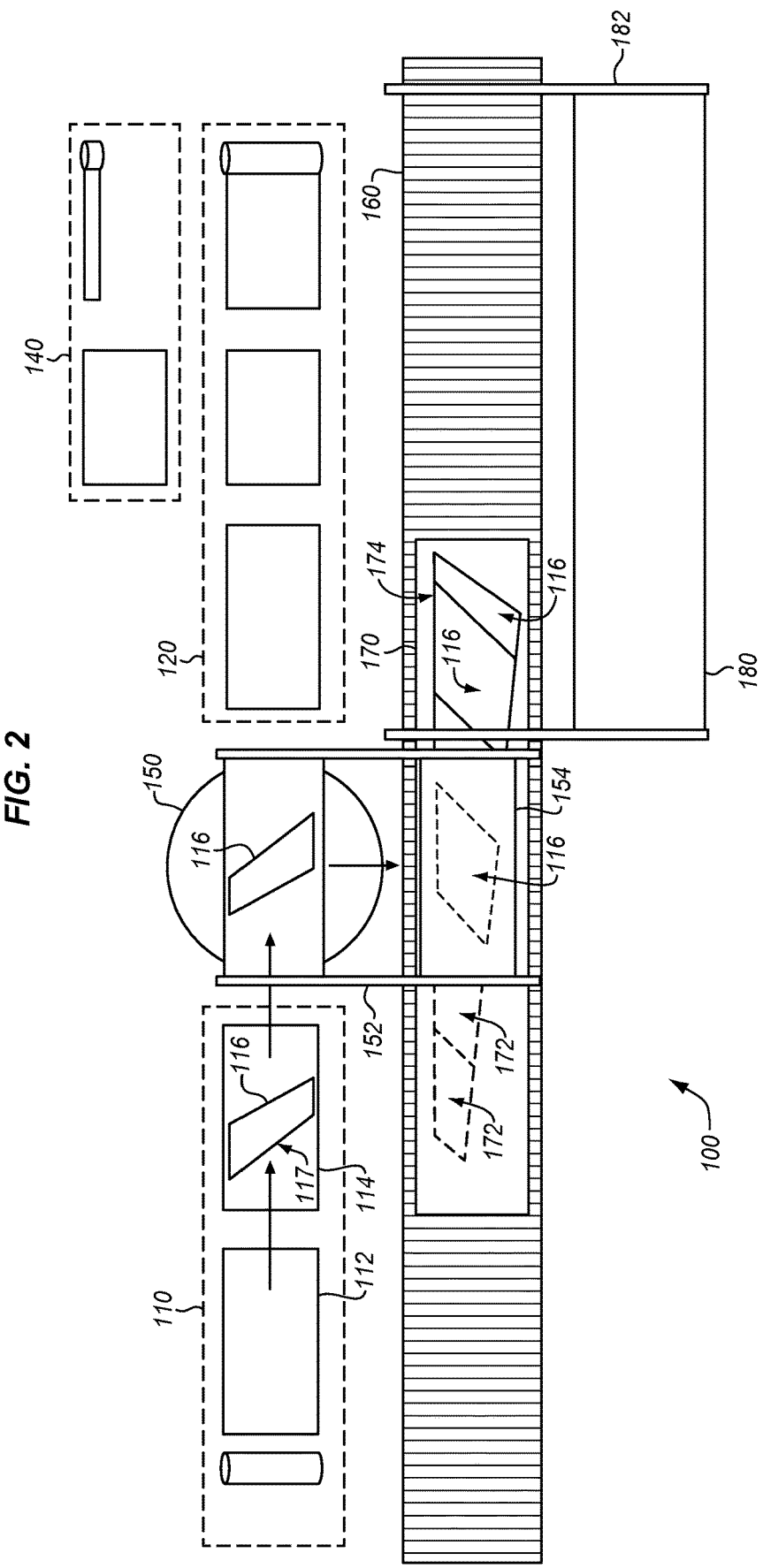
Figure 3:
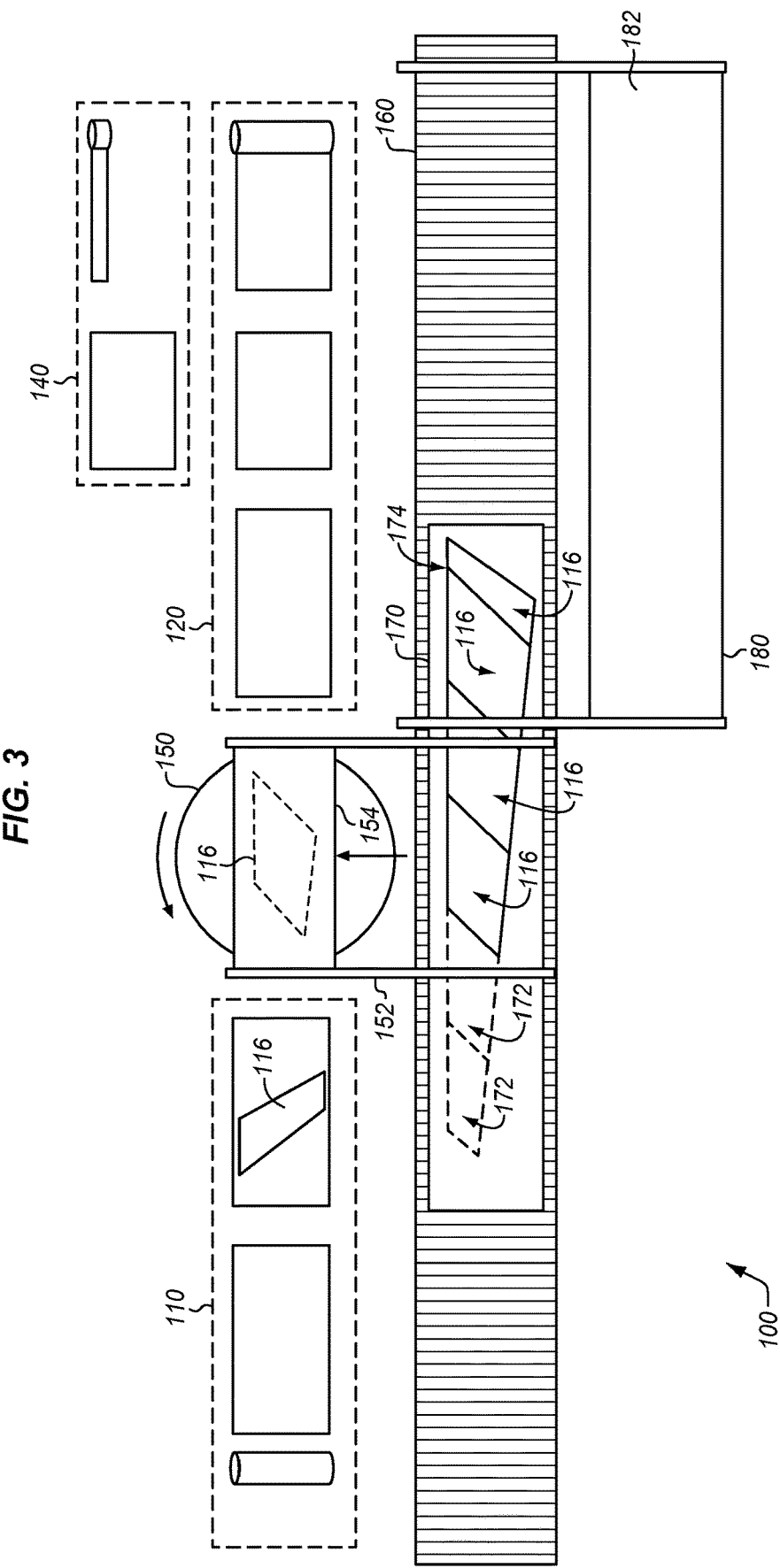

In FIG. 2, a layup piece 116 that has been rotated into alignment at a rotary table 150 is transported via carrier 154 to a placement location 172 at the shuttle 170. Meanwhile, a next layup piece 116 is placed onto the rotary table 150 and a cut 117 is made at another layup piece 116. In FIG. 3, the next layup piece 116 has been rotated and the carrier 154 has been moved over the rotary table 150 to acquire and transport the next layup piece 116 to the shuttle 170. While only one preform 194 for a wing skin is shown, the rotary table 150 enables rotations of the layup pieces 116 into suitable orientations for left and right wing skins, upper and lower wing skins, etc. Thus, one assembly line 100 can be utilized to fabricate four separate types of wing panels, and/or wing panels for other models.

Figure 4:
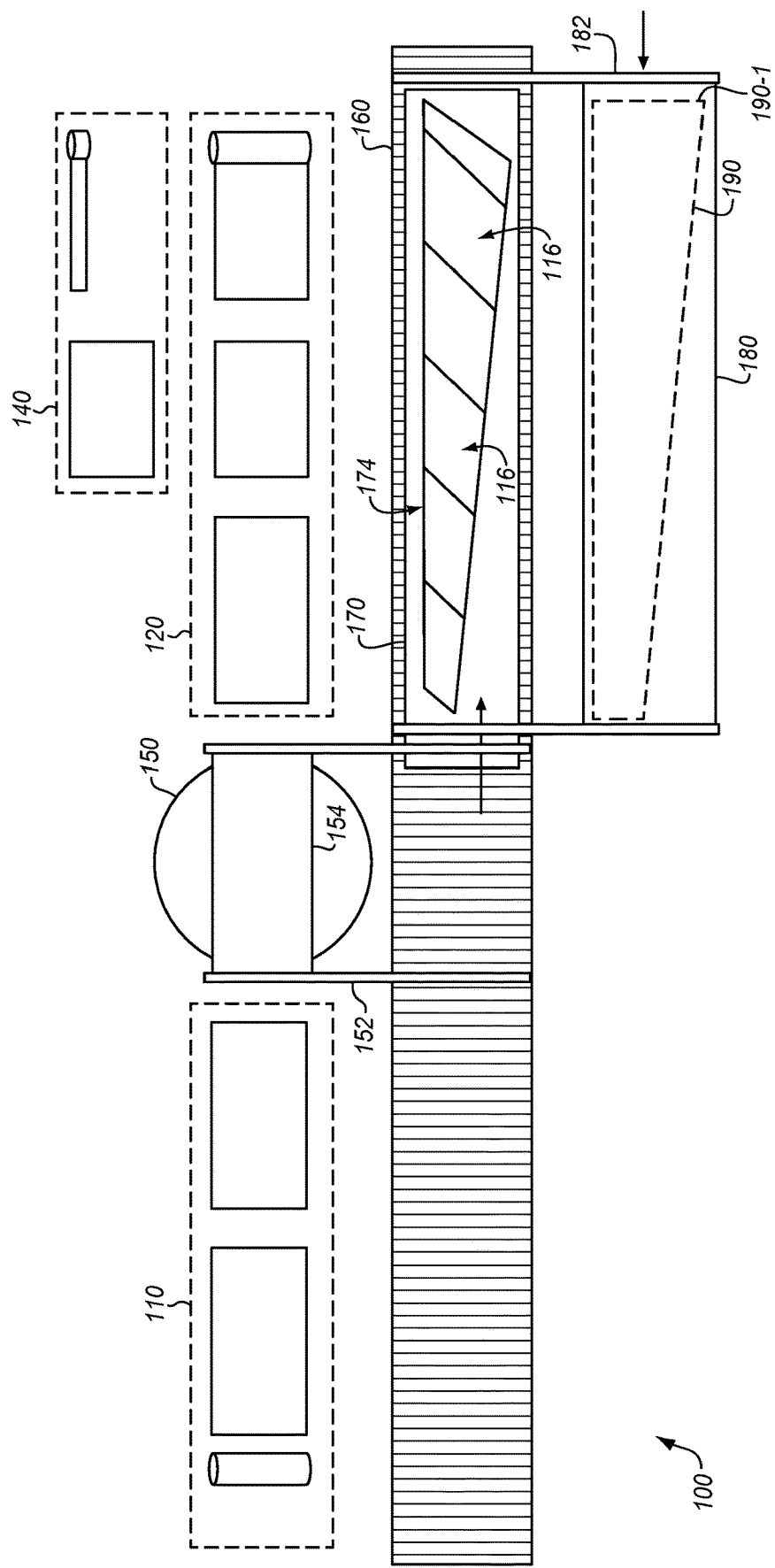
Figure 5:
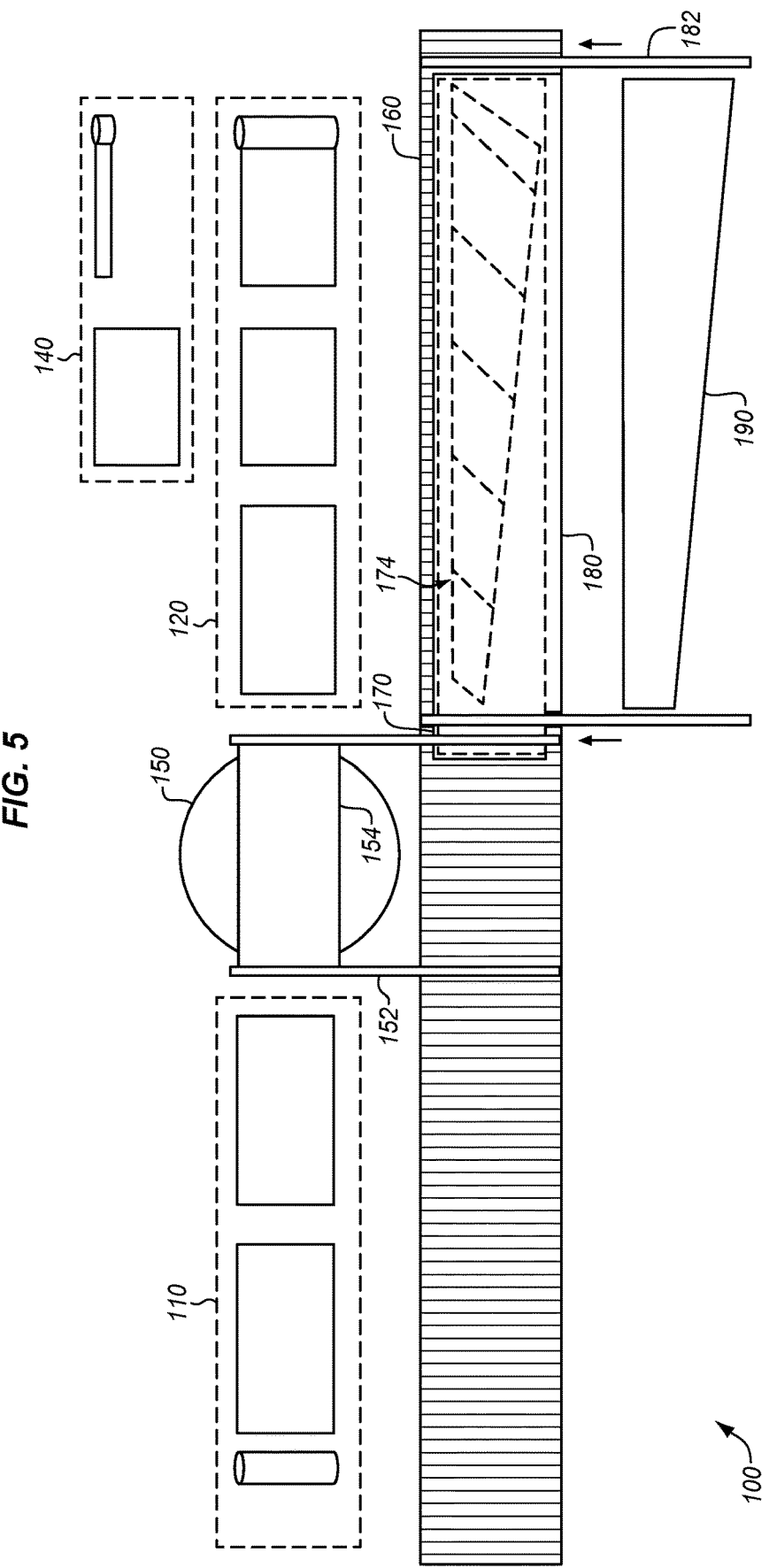
Figure 6:
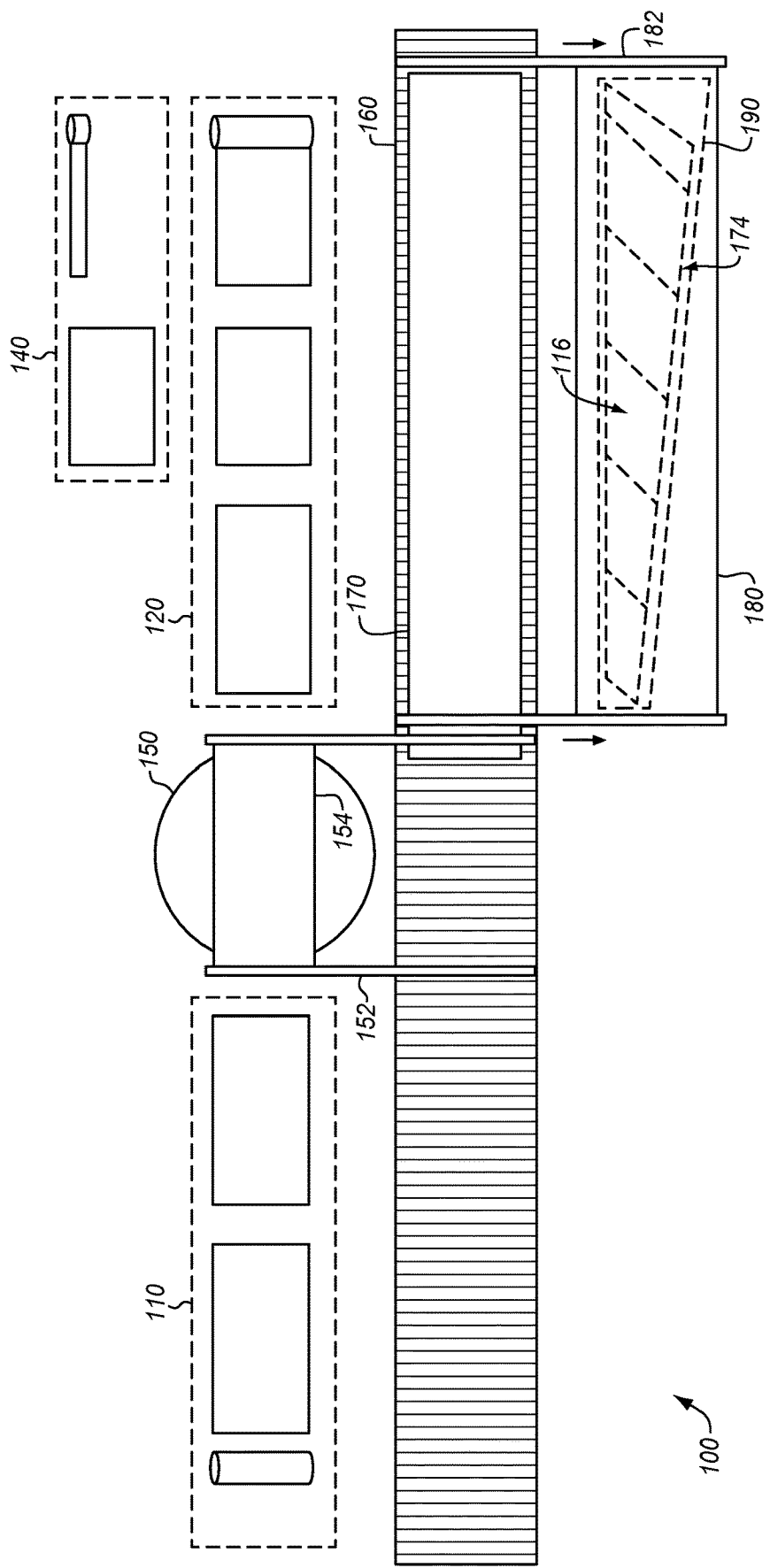
Figure 7:
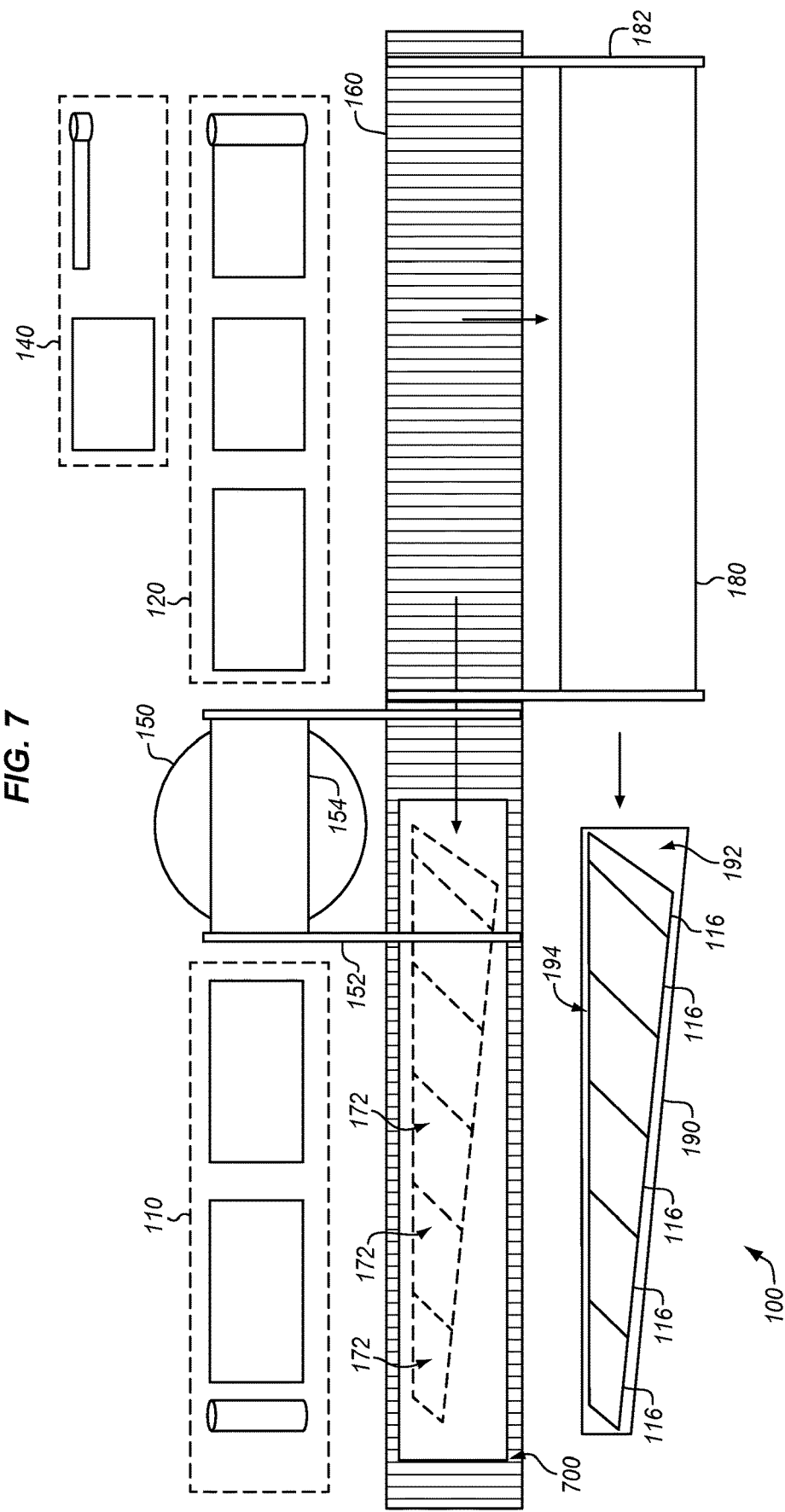

In FIG. 4, a layup pattern 174 comprising one or more layers, such as one or two to four plies 175 of fiber reinforced material, has been placed onto the shuttle 170. Each ply has the fiber reinforcement at an orientation throughout the ply and at a different orientation or the same orientation as an adjacent ply. Each of the two to four layers has to be spliced to adjoined two to four layers. In one embodiment, boundaries 119 of layup pieces 116 in different layers of the layup pattern 174 are staggered, crossed, or otherwise arranged relative to adjacent layers such that they do no result in a stacking of the boundaries 119 through a plurality of adjacent layers. The shuttle 170 carries the layup pattern 174 along track 160 until the shuttle 170 is positioned to receive carrier 180. In FIG. 5, the carrier 180 is moved over the layup pattern 174, and picks up the layup pattern 174 via vacuum coupling. In FIG. 6, the carrier 180 moves along frame 182 until the layup pattern 174 is disposed over a layup mandrel 190. The carrier 180 then releases the vacuum coupling to the layup pattern 174, and applies a separate vacuum that compresses the layup pattern 174 into place onto the layup mandrel 190. In a further embodiment, positive airflow is provided from the carrier 180 in order to push the layup pattern 174 away from carrier 180 and onto the layup mandrel 190. In FIG. 7, the shuttle 170 returns to an initiation position 700, and the layup mandrel 190, which has received one or more layup patterns 174 that form a preform 194, is advanced to a next process prior to an autoclave (not shown) or similar device for hardening. After hardening, manufacturing excess can be partially trimmed off, leaving indexing features on a remaining manufacturing excess, or fully trimmed off from the resulting composite part. The trimming is performed prior to assembly, with a precision that does not require a final trimming after assembly to finalize the leading and trailing edges. That is, the layup pieces 116-1 through 116-6 are trimmed and placed with sufficient precision that the resulting ply 175 does not need a perimeter trim to achieve desired final panel dimensions.

FIGS. 7A-7D depict flow arrangements for an assembly line in illustrative embodiments. Each of these arrangements show alternative configurations of multiple assembly lines (e.g. assembly line 100 or broad goods lamination stations 151) for fabricating an airframe component from broad goods. Broad goods lamination station 151 (as shown in FIG. 1) includes broad goods station 110, rotary table 150 or other orienting station, and placement stations 155 and 181-1 for fabricating a preform from broad goods. At each of the plurality of broad goods lamination stations in FIGS. 7A-7D, work is performed at a layup mandrel.

Figure 7A:
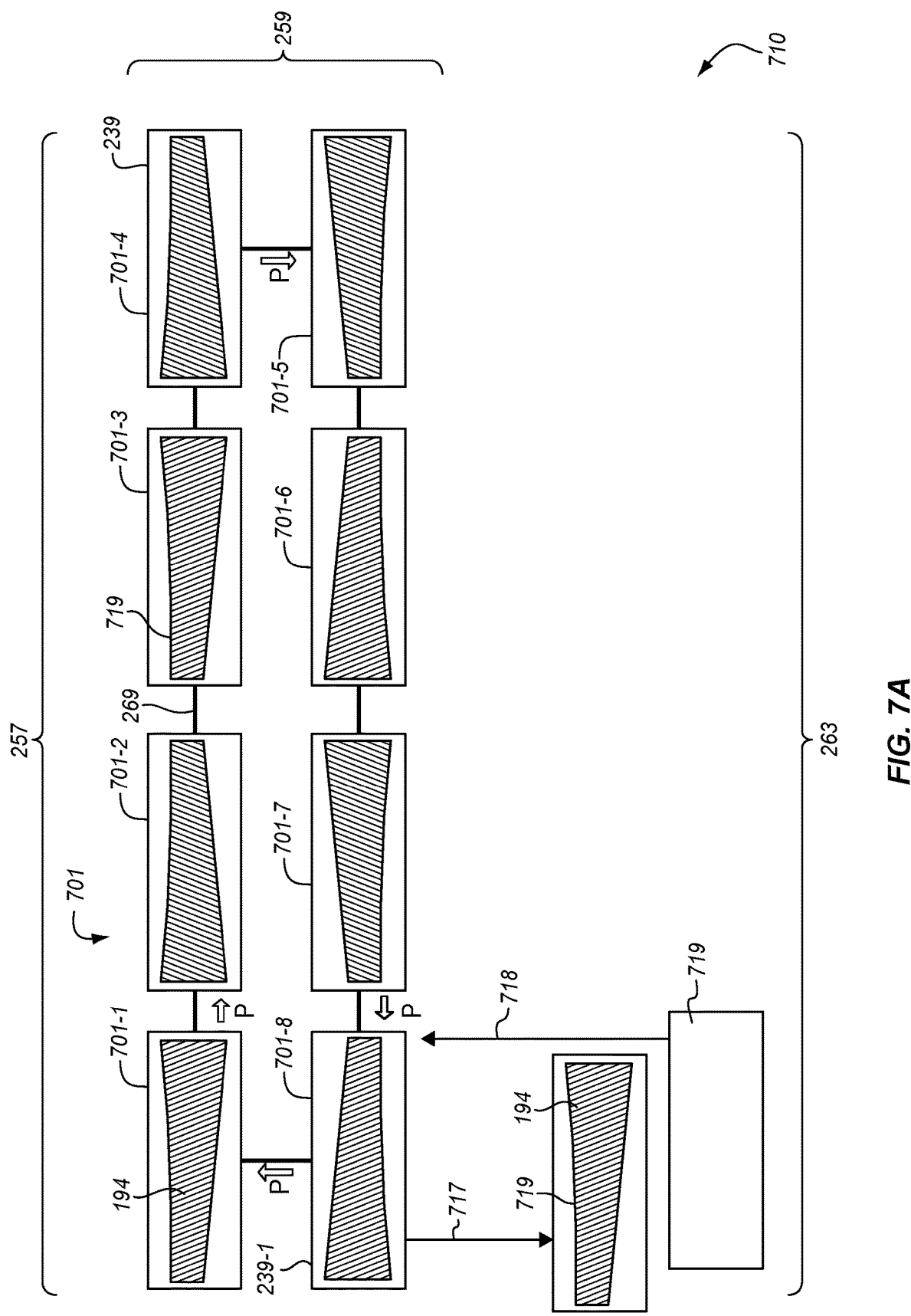
FIGS. 7A-7D depict flow arrangements for assembly lines in illustrative embodiments.

Referring to FIG. 7A, in an example, an assembly line 710 is depicted which includes broad goods lamination stations 701-1 through 701-8, collectively referred to as "stations 701," that are disposed along loop 269. The stations 701 perform work on a layup mandrel 719 which enters via direction 718, and proceeds in a micro pulsed, full pulsed, or continuous fashion along the stations 701 disposed at loop 269. In this example, a plurality of mandrels 719, such as upper and lower wing skin panels, are being processed in assembly line 710 along loop 269. In this example, layup mandrel 719 progresses through horizontal segment 257 left to right through stations 701-1, 701-2, 701-3, and 701-4 and then right to left in the adjacent horizontal segment 263 through stations 701-5, 701-6, 701-7, and 701-8. With this left to right and then right to left arrangement processing through the stations 701-1 through 701-8, the layup mandrel 719 never turns orientation relative to the stations 701-1 through 701-8 and merely laterally shifts between horizontal segment 257 and adjacent horizontal segment 263. The preform 194 on the mandrel progresses through the stations 701-1 through 701-8 until completed and then layup mandrel 719 and preform 194 exits via direction 717. As needed, the mandrel 719 may require multiple passes through loop 269 and stations 701-1 through 701-8 to complete preform 194. In some examples, one or more stations 701-n may be located along the vertical segment 259, while in other examples, there may not be any stations 701-n located along the vertical segment 259, in which case the layup mandrels 719 are laterally shifted directly from one horizontal segment 257 to an adjacent horizontal segment 263.

In this example, the layup mandrel 719 reaches an end 239 of a horizontal segment 257 and is laterally shifted, rather than pivoted, and proceeds along the vertical segment 259, resulting in no change of orientation of the layup mandrel 719 relative to the process direction P. The layup mandrel 719 reaches the end 239-1 of horizontal segment 263 to complete movement through loop 269. Layup mandrel 719 and preform 194 exit laterally via direction 717 and is replaced by another layup mandrel 719 in loop 269.

In the configuration of FIG. 7A, the lateral movement of mandrel 719 within loop 269 allows for a compact assembly line 710 without the need for additional floor space due to the fact that the mandrel 719 never needs to pivot. A further benefit of this compact configuration is that manpower required to operate stations 701 may be shared between the horizontal segment 257 and adjacent horizontal segment 263.

Figure 7B:
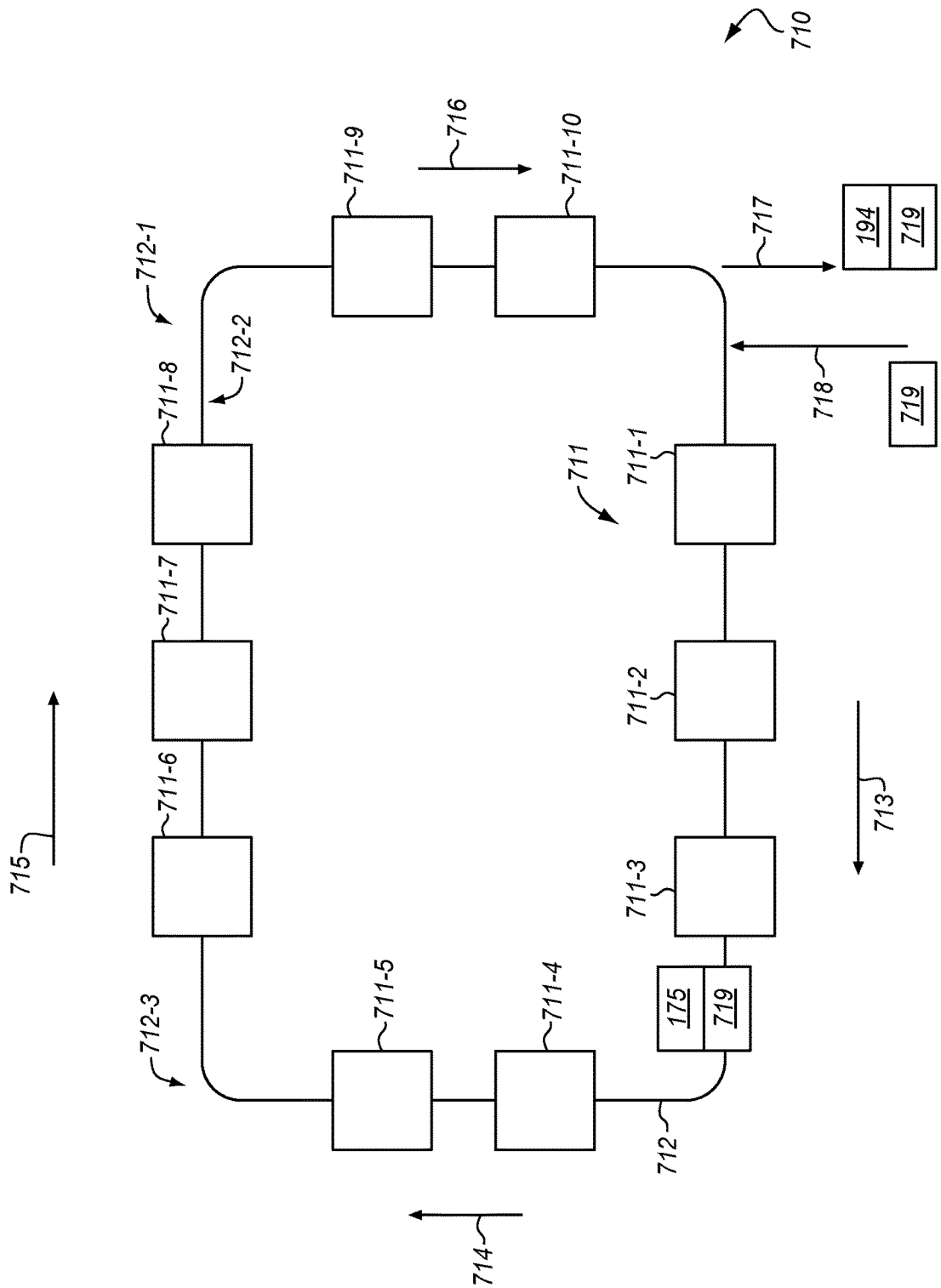

In FIG. 7B, an assembly line 710 is depicted which includes broad goods lamination stations 711-1 through 711-10, collectively referred to as "stations 711," that are disposed along loop 712. The stations 711 perform work on a layup mandrel 719 which enters loop 712 via direction 718, and proceeds in a micro pulsed, full pulsed, or continuous fashion along the stations 711 disposed at loop 712 across directions 713, 714, 715, and 716. After one or more laps through loop 712, layup mandrel 719 exits via direction 717. The orientation of layup mandrel 719 is turned to conform to the orientation of loop 712. Any of stations 711 depicted herein may be implemented as one or more of the broad goods lamination stations 151 discussed above with regard to FIG. 1. Stations 711-1 through 711-10 may be implemented on either side 712-1 and 712-2 of loop 712 (e.g., to facilitate a return loop operation), and the layup mandrel 719 may receive layup from one or more of the stations 711. The layup (e.g. layup pieces 116) may be spliced together to form a ply 175, and splice locations may be staggered from ply to ply to avoid stacking splices directly upon prior splices. The layup mandrel 719 continues to receive layup pieces 116 until the preform 194 is completed. In one embodiment, the layup pieces 116 exhibit varied orientations. After the preform 194 has received all plies, the preform 194 and the mandrel 719 exit for further processing, and one or more other layup mandrels 719 are added to loop 712. In one embodiment, multiple mandrels 719 progress along loop 712 in a synchronized fashion, wherein these components are pulsed and paused at the same time.

Figure 7C:
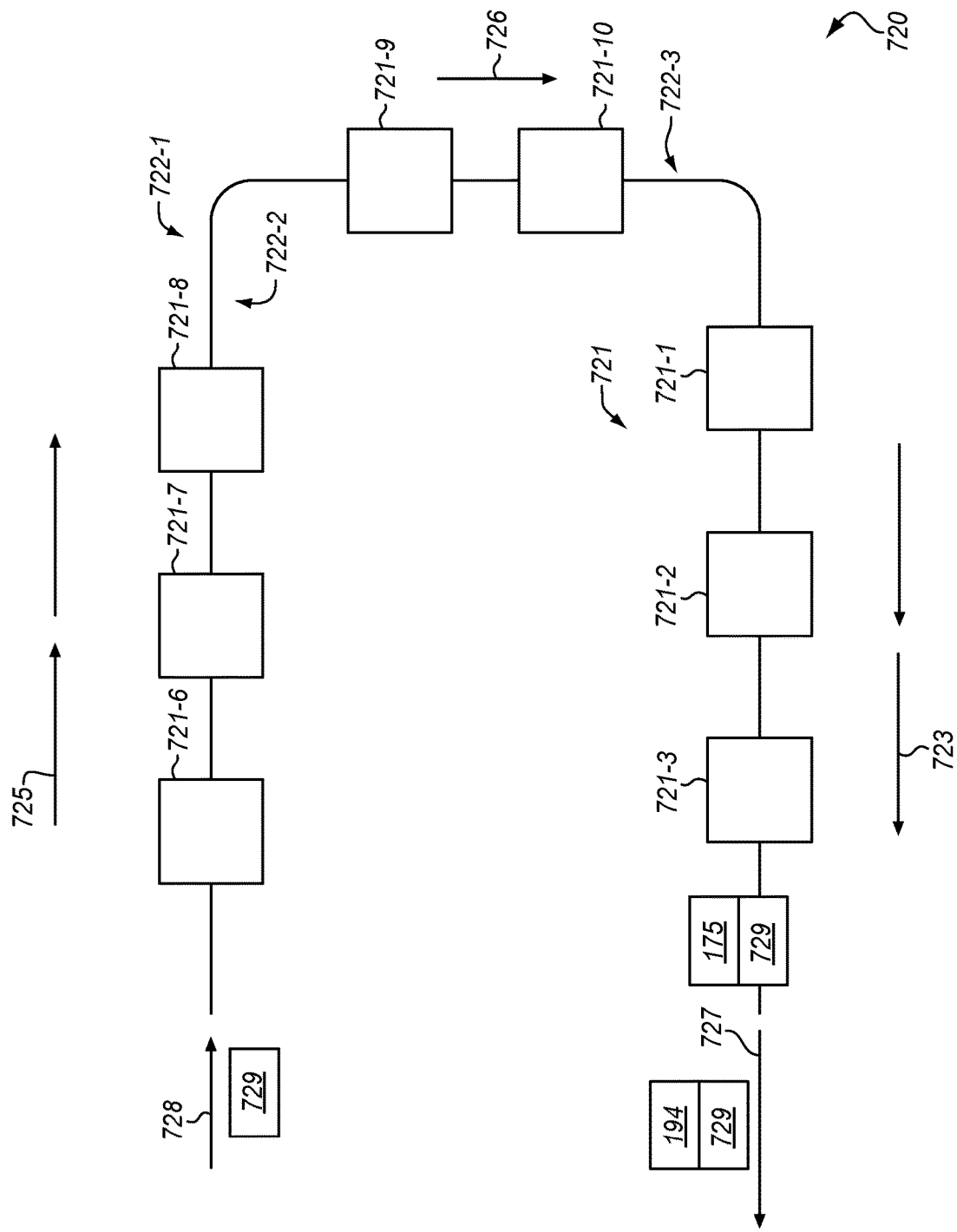

In FIG. 7C, an assembly line 720 is depicted which includes broad goods lamination stations 721-1 through 721-3, and 721-6 through 721-10 (collectively referred to as "stations 721") that are disposed along loop 722 that forms a "U" shape 722-3. The stations 721 perform work on a layup mandrel 729 which enters loop 722 via direction 728, and proceeds in a micro pulsed, full pulsed, or continuous fashion along the stations 721 disposed at loop 722 across directions 725, 726, and 723. The orientation of the layup mandrel 719 is turned to conform to the orientation of loop 722. After proceeding along loop 722, layup mandrel 729 and preform 194 exit via direction 727. Any of the stations 721 depicted herein may be implemented as one or more of the broad goods lamination stations 151 discussed above with regard to FIG. 1. Stations 721-1 through 721-3 and stations 721-6 through 721-10 may be implemented on each side 722-1 and 722-2 of loop 722, and the layup mandrel 729 may receive layup from one or more of the stations 721. The layup (e.g. layup pieces 116) may be spliced together to form a ply 175, and splice locations may be staggered from ply to ply to avoid stacking splices directly upon prior splices. The layup mandrel 729 continues to receive layup pieces 116 until the preform 194 is completed. In one embodiment, the layup pieces 116 exhibit varied orientations. After preform 194 has received all plies, preform 194 and mandrel 729 exit for further processing, and one or more other layup mandrels 729 are added to loop 722. In one embodiment, multiple mandrels 729 progress along loop 722 in a synchronized fashion, wherein these components are pulsed and paused at the same time.

Figure 7D:
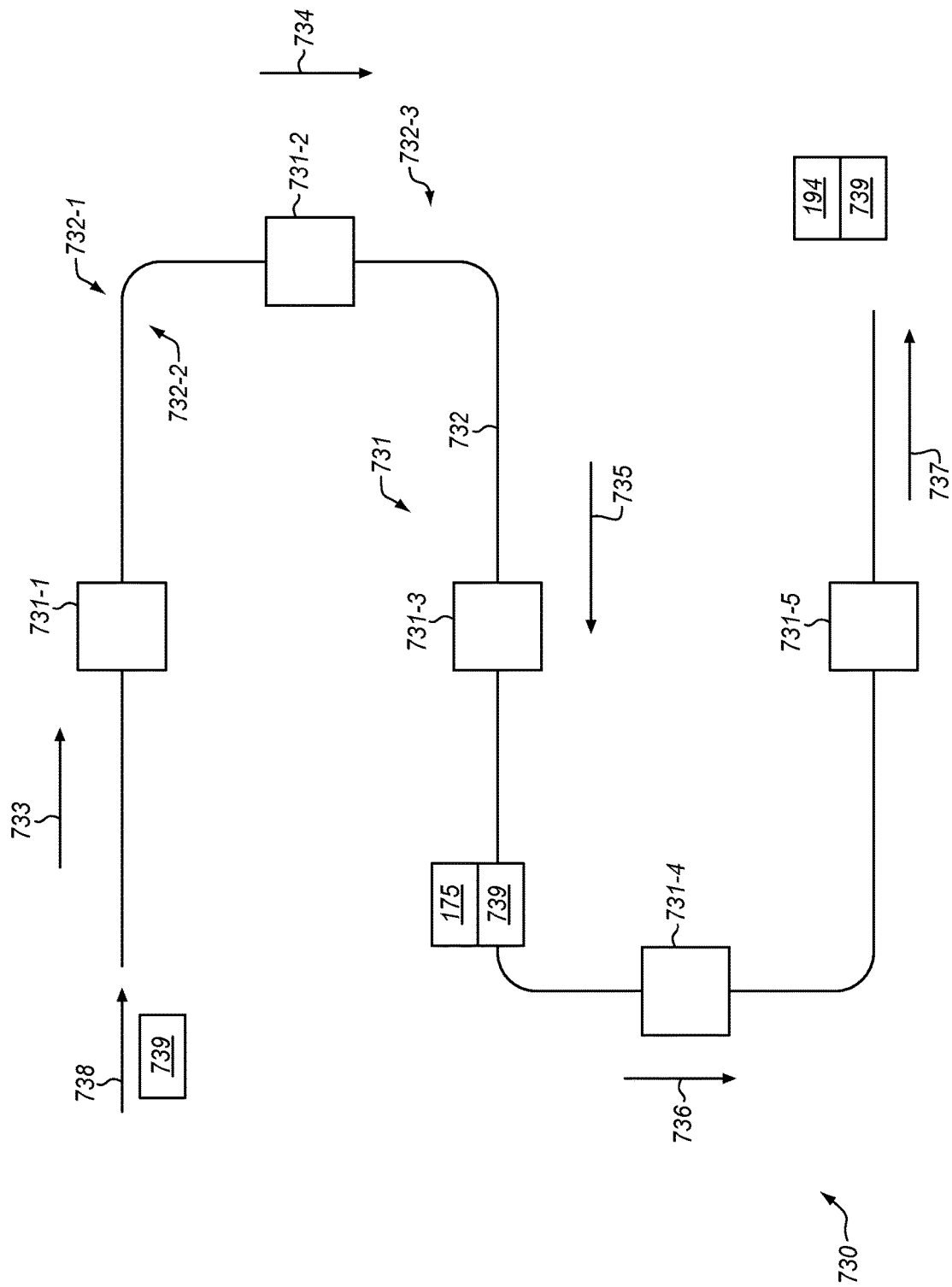

In FIG. 7D, an assembly line 730 is depicted which includes broad goods lamination stations 731-1 through 731-5 (collectively referred to as "stations 731") that are disposed along loop 732 that forms an "S" shape 732-3. The stations 731 perform work on a layup mandrel 739 which enters loop 732 via direction 738, and proceeds in a micro pulsed, full pulsed, or continuous fashion along the stations 731 disposed at loop 732 across directions 733, 734, 735, and 736. After proceeding through loop 732, the layup mandrel 739 exits via direction 737. Any of the stations 731 depicted herein may be implemented as one or more of the broad goods lamination stations 151 discussed above with regard to FIG. 1. Stations 731-1 through 731-10 may be implemented on each side 732-1 and 732-2 of loop 732, and the layup mandrel 739 may receive layup from one or more of the stations 731. The layup (e.g. layup pieces 116) may be spliced together to form a ply 175, and splice locations may be staggered from ply to ply to avoid stacking splices directly upon prior splices. The layup mandrel 739 continues to receive layup pieces 116 until preform 194 is completed. In one embodiment, the layup pieces 116 exhibit varied orientations. After preform 194 has received all plies, preform 194 and mandrel 739 exit for further processing, and one or more other layup mandrels 739 are added to loop 732. In one embodiment, multiple mandrels 739 progress along loop 732 in a synchronized fashion, wherein these components are pulsed and paused at the same time.

Figure 7E:
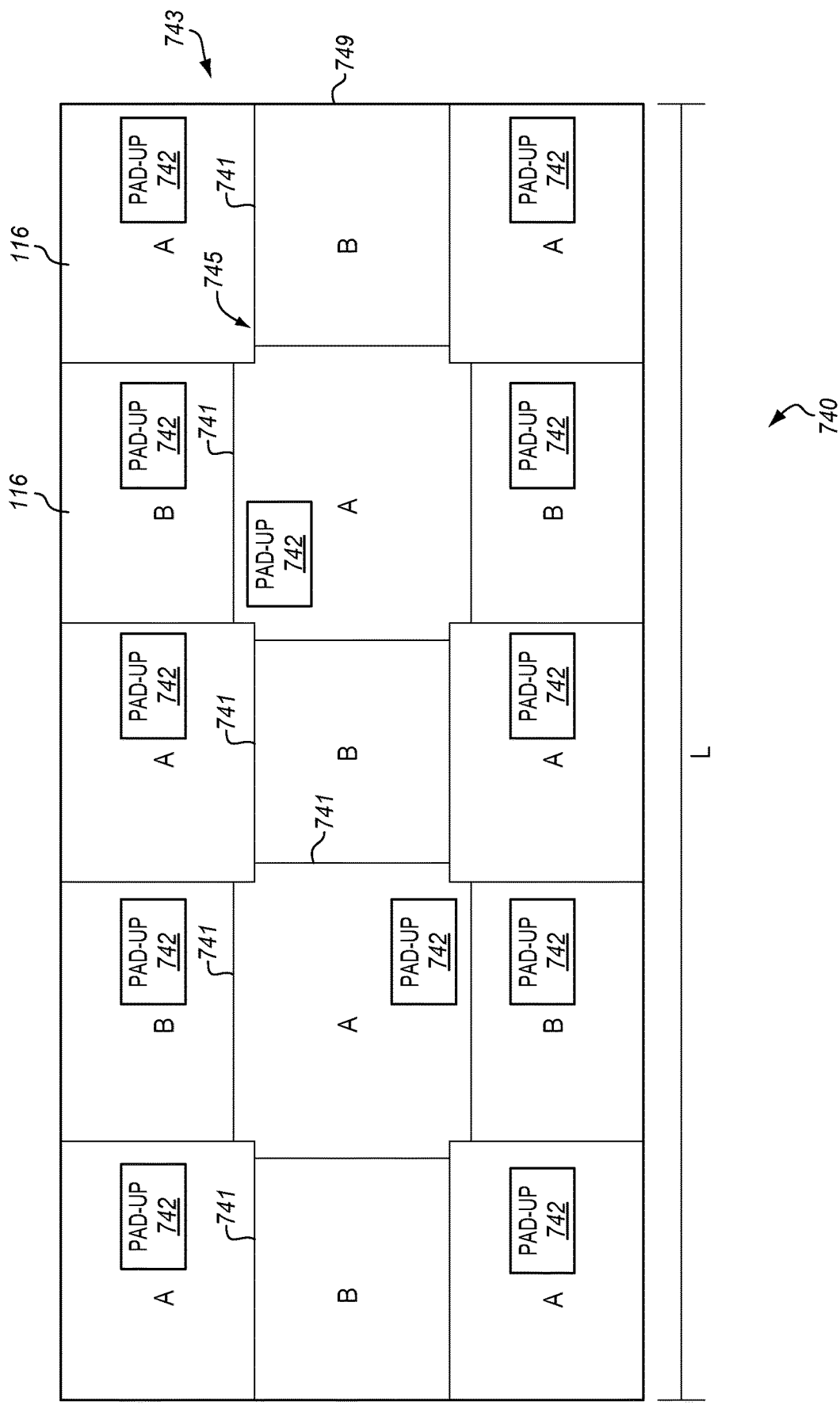

FIGS. 7E-7F depict layup patterns in illustrative embodiments. FIG. 7E is a top view of a layup pattern 740 for a laminate 749 in an illustrative embodiment. According to FIG. 7E, layup pattern 740 includes zones A and zones B, as indicated by "A" and "B" on layup pieces 116 of laminate 749. Splices 741 between the layup pieces 116 in zones A and B vary along the length L of the laminate 749, forming a staggered pattern 743 and preventing a single seam from being formed along the length of the ply map. That is, zonal lamination is performed such that boundaries 745 between the layup pieces 116 in zones A and B are staggered across layers in order to avoid boundary 745 and/or splice 741 stack-up. In further embodiments, zones overlap in angled shapes depending on the fiber orientation of material being laid-up.

Each splice 741 may be formed by the placement of different layup pieces 116. While the splices 741 are shown as lines, each splice 741 occupies a narrow region between neighboring zones where layup pieces 116 from the zones are butt spliced, overlap spliced, or otherwise made physically integral with each other. Each ply 175 being spliced may have boundaries 745 that are unique, and the boundaries 745 may vary by a fraction of an inch between neighboring plies, resulting in splices 741 that are staggered through the thickness of the zones. That is, the location of a splice 741 changes incrementally between layers, forming a staggered pattern 743 (e.g., stairstep pattern, staggered shape, etc.) through multiple plies. Staggering splices prevents overlaps from stacking on top of each other and causing build-up of material. Thus, the locations of cuts for splices 741 vary between plies 175 in one embodiment. The splices 741 extend across a plurality of plies. In this embodiment, the splices 741 are selected/placed such that they do not intersect the pad-ups 742, in order to prevent substantial increases in thickness or complexity near pad-ups 742. Thus, the boundaries 745 are staggered from ply 175 to ply 175.

FIG. 7F illustrates a similar arrangement of layup pieces 116 in zones A and B, as well as splices 741 of a laminate 750 for a wing skin. Pad-ups 742 are also included in the laminate 750, and may be utilized to provide reinforcement for access panels, wing flaps, etc. FIGS. 7E-7F illustrate that the zonal lamination techniques discussed herein can be utilized for a variety of laminate designs.

Illustrative details of the operation of assembly line 100 will be discussed with regard to FIG. 8A. Assume, for this embodiment, that rolls 130 of broad goods comprising continuous fiber reinforced material have been loaded at the assembly line 100.

Figure 8A:
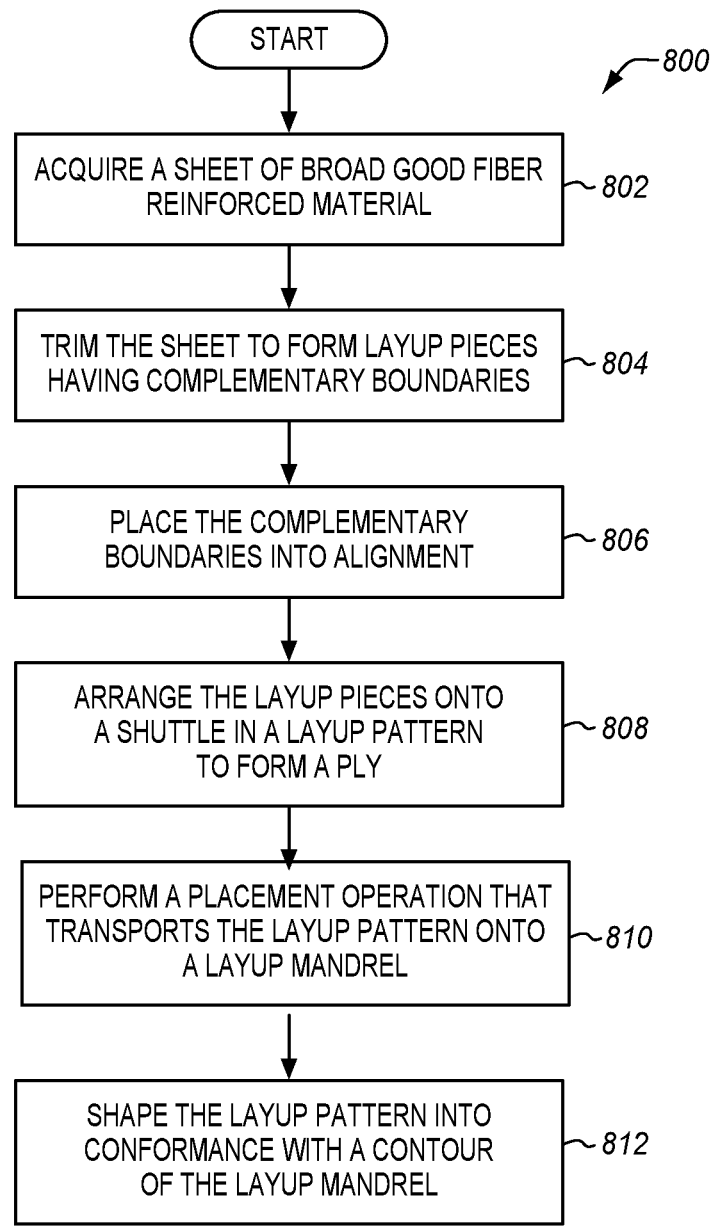
FIGS. 8A-8B are flowcharts illustrating methods for fabricating an airframe component from broad goods in an illustrative embodiment.

FIG. 8A is a flowchart illustrating a method 800 for fabricating an airframe in an illustrative embodiment. The steps of method 800 are described with reference to assembly line 100 of FIG. 1, but those skilled in the art will appreciate that method 800 may be performed in other systems. The steps of the flowcharts described herein are not all inclusive and may include other steps not shown. The steps described herein may also be performed in an alternative order.

In step 802, a sheet 118 of fiber reinforced broad goods is acquired by the assembly line 100. In one embodiment, acquiring the sheet 118 comprises threading the sheet 118 through first cutting station 112 and second cutting station 114.

Step 804 comprises trimming the sheet 118 (e.g., applying cuts to the sheet 118) to form layup pieces 116 having boundaries 119 that are complementary. The cuts for each of the layup pieces 116 are applied as a first straight cut 113 from a first cutting station 112, followed by a second straight cut 115 from a second cutting station 114. Each first straight cut 113 proceeds across the entire width of the sheet 118 of broad goods, at a desired angle (e.g., a leading edge 195 angle or a trailing edge 197 angle). Meanwhile, second straight cuts 115 are applied to pieces created by the first cuts. For example, for each piece, one cut may correspond with a leading edge 195 angle for a wing skin, while the other cut may correspond with a trailing edge 197 angle for the wing skin. This enables cutting of a constant width broad good material via two cuts to create pieces with two parallel edges that taper to form shapes desired for placement as a layer of, for example, a wing skin. In short, a composite structure is formed from several layup pieces 116 that are each created with two straight cuts of a broad good piece and then placed to adjoin to each other. The arrangement of the cuts and the sizing of the layup pieces 116 results in little to no wasted material reduces the "buy to fly" cost of a resulting aircraft. This approach of using straight cuts saves time and eliminates complexity, while also reducing waste.

Step 806 includes placing the boundaries 119 into alignment (e.g., by rotating and translating the layup pieces 116). In this embodiment, because the edges of the sheet 118 of broad goods form sides of the layup pieces (116), the layup pieces 116 can be placed side-by-side without overlap, by placing the boundaries 119 together (i.e., by butting together the layup pieces 116 as part of a splicing process). In this embodiment, the edges of the sheet 118 of broad goods form complementary sides of the layup pieces 116. By aligning the complementary sides such that they are rotated to a common angle, the layup pieces 116 can be combined into a single layup pattern 174 simply by translating the layup pieces 116. In one embodiment, trimming the sheet/applying cuts to the sheet 118 results in the layup pieces 116 exhibiting a shared leading edge 195 angle and shared trailing edge 197 angle, and rotating the layup pieces 116 comprises orienting leading edges of the layup pieces 116 to a common angle (e.g., a leading edge angle or a trailing edge angle). In further embodiments, several rows of layup pieces 116-1 through 116-6 that span across the chordwise direction are utilized to form a single layup pattern 174.

Step 808 includes arranging the layup pieces 116 onto a shuttle 170 in a layup pattern 174 to form one or more plies 175. That is, the layup pattern 174 itself comprises one or more plies 175. In this embodiment, this step includes moving the shuttle 170 laterally until a new placement location 172 is exposed, and then moving carrier 154 until a layup piece 116 is aligned with the placement location 172. The layup piece 116 is then placed into position. These operations continue for multiple layup pieces 116 until an entire layup pattern 174 is created. Depending on embodiment, arranging the layup pieces 116 into the layup pattern 174 comprises arranging the layup pieces 116 into a shape of a wing skin (e.g., wing skin 900 of FIG. 9) or a shape of a fuselage skin (e.g., fuselage skin 1852 of FIG. 18). Thus, in one embodiment, the layup pattern 174 forms a ply 175 for a wing skin (e.g. wing skin 900 of FIG. 9). In a further embodiment, arranging the layup pieces 116 into the layup pattern 174 comprises arranging the layup pieces 116 into a shape of one or more plies 175 for a fuselage skin (e.g., fuselage skin 1852 of FIG. 18).

Step 810 includes performing a placing operation that transports the layup pattern 174 onto a layup mandrel 190. This operation comprises moving shuttle 170 along track 160, then picking up the entire layup pattern 174 at once with a carrier 180, and moving the layup pattern 174 to a layup mandrel 190. In further embodiments, placement is performed manually instead of via automated Pick and Placement (PNP) processes. Thus, in one embodiment PNP processes are performed automatically via a PNP station 181, while in another embodiment placement is performed manually.

In step 812, the layup pattern 174 is shaped into conformance with a contour 192 of the layup mandrel 190. This comprises driving the carrier 180 into the layup mandrel 190 to conform the layup pattern 174 against a contour 192 of the layup mandrel 190. In one embodiment, shaping the layup pattern 174 comprises applying vacuum via the carrier 180 to the layup pattern 174 for consolidating/conforming/compressing the layup pattern while performing the PNP operation. Thus, in one embodiment, shaping the layup pattern 174 is performed by a carrier 180 that performs the placement operation.

The steps of method 800, including the trimming, placing, arranging, performing a placement operation, and shaping may be iteratively performed until a preform 194 is completed at the layup mandrel 190. Furthermore, in one embodiment, the operations of acquiring, trimming/applying cuts, rotating, arranging, placing (e.g., performing a PNP operation), and shaping are performed via the stations of the assembly line 100 synchronously in a pulsed fashion, wherein pulses of work are followed by pauses.

In further embodiments, the operations of acquiring, trimming/applying cuts, rotating, arranging, placing (e.g., performing a PNP operation), and shaping are performed according to a takt time. In such an embodiment, assembly line 100 operates as a feeder line, wherein a takt time for assembly line 100 is synchronized with a takt time for one or more other feeder lines (e.g., a feeder a line 191 for fabricating a wing skin at a mandrel 190), or is distinct from one or more feeder lines. Multiple feeder lines such as assembly line 100 may provide multiple layup pieces 116 to multiple locations along a looped, "S" shaped or "C" shaped assembly line (e.g. systems of FIG. 7A through 7D) to apply multiple plies 175 to a layup mandrel 190 and/or preform as it progresses in a process direction. The takt time for the feeder lines do not have to be the same as the takt time used for a looped, "S" shaped or "C" shaped assembly line (e.g. systems of FIG. 7A through 7D). In one embodiment, multiple assembly lines 100 feed layup pieces 116 to the same wing skin at the same time.

Furthermore, while the assembly line 100 is depicted as fabricating wing skins, in further embodiments the assembly line 100 is utilized to fabricated sections of fuselage, empennage sections, engine nacelles, doors, flaps, slats, and/or other components.

Figure 8B:
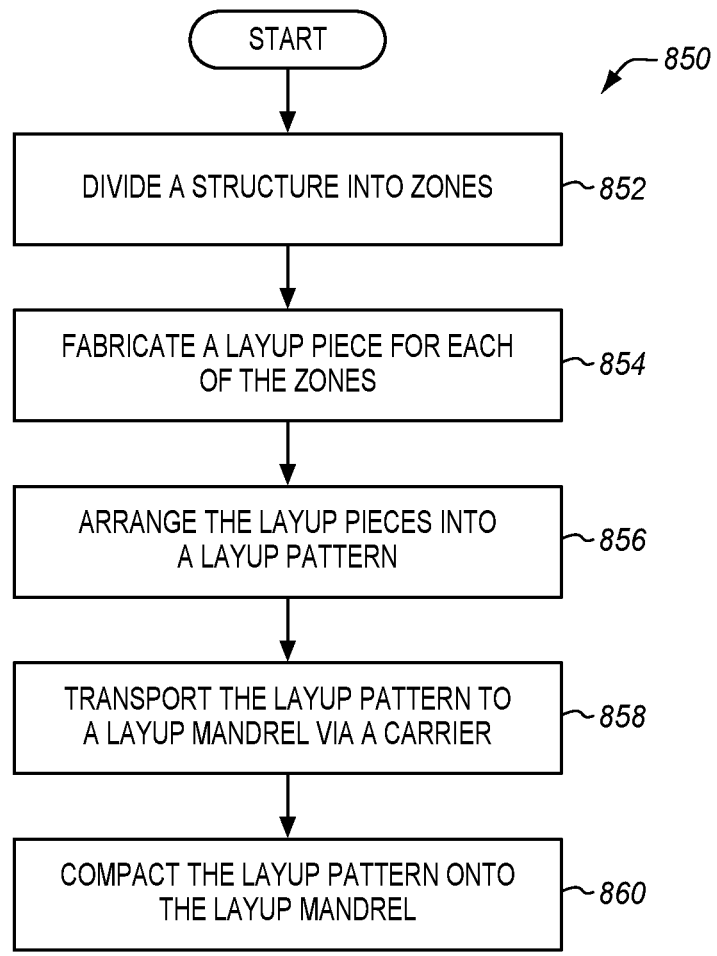

FIG. 8B is a flowchart illustrating a method 850 for fabricating a composite structure of an airframe in an illustrative embodiment. Step 852 includes dividing a composite structure into zones (e.g., zones 902-2 through 902-5, collectively referred to as zones 902 of FIG. 9). In one embodiment, the zones (e.g., zones 902-2 through 902-5 of FIG. 9) correspond with the shapes and sizes of the placement locations 172.

Step 854 includes fabricating a layup piece 116 for each of the zones 902. Fabricating the layup pieces 116 comprises performing the trimming/cutting operations discussed above by the stations of the assembly line 100. In step 856, the layup pieces 116 are arranged into a layup pattern 174. Each layup piece 116 occupies a zone (e.g., any of zones 902-2 through 902-5 of FIG. 9) of the layup pattern 174. This comprises operating the rotary table 150 and the carrier 154 to place the layup pieces 116 into the layup pattern 174. In one embodiment, arranging the layup pieces 116 into the layup pattern 174 comprises arranging the layup pieces 116 into a shape of a wing skin (e.g., wing skin 900 of FIG. 9) or a shape of a fuselage skin (e.g., fuselage skin 1852 of FIG. 18).

Step 858 includes transporting the layup pattern 174 to a layup mandrel 190 via a carrier. In this embodiment, the operation is performed by advancing a shuttle 170 carrying the layup pattern 174 underneath a carrier 180. Thus, in one embodiment, transporting the layup pattern 174 comprises operating a Pick and Place (PNP) station 181.

Step 860 includes compacting the layup pattern 174 onto the layup mandrel 190 to fabricate the preform 194. In this embodiment, this comprises utilizing the carrier 180 to pick up, place, and compact the entire layup pattern 174 at once onto the layup mandrel 190. In a further embodiment, the method further comprises disposing edges of the layup pattern 174 onto the layup mandrel 190 such that the edges are staggered with respect to other layup patterns 174 for the layup mandrel 190.

Methods 800 and 850 provide a substantial advantage over prior techniques, because it enables rapid fabrication of large composite structures from broad goods, without the need for slow trimming/cutting processes, such as manual processes or automated processes that trace a shape for a composite part with a single cutter head. In further embodiments, it is possible to have more than one broad goods station 110 or small-piece station 120 feeding materials at the same time and to multiple placement stations around a looped, "S" shaped or "C" shaped assembly line (e.g.

systems of FIG. 7A through 7D). This type of parallel processing accelerates the fabrication process. Furthermore, the use of broad goods also increases the rate at which layup is performed, because pick and place operations are substantially faster than utilizing a placement head to layup a piece and then trim it.

Figure 9:
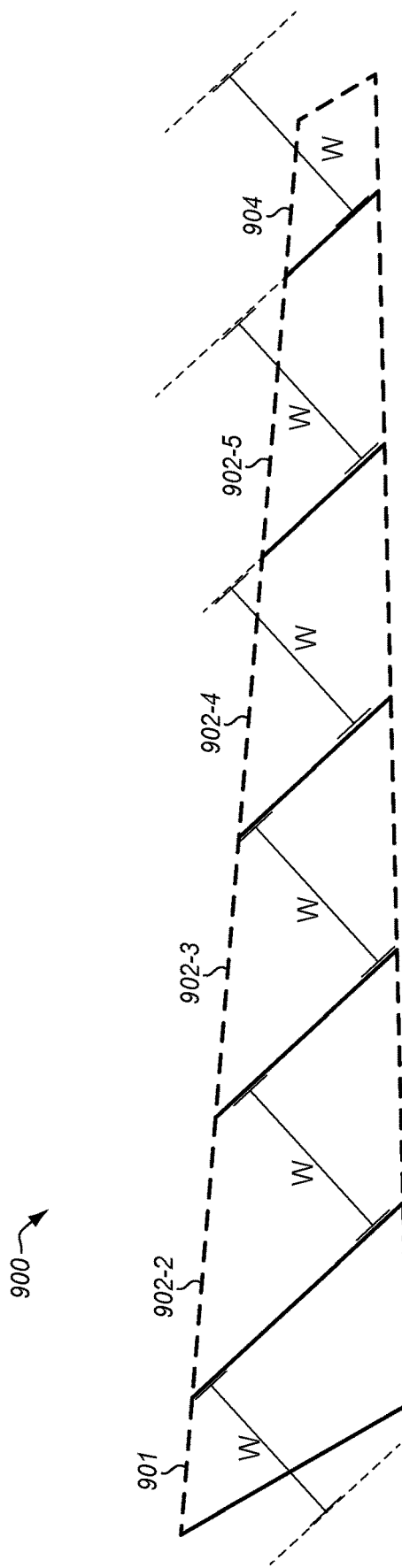
FIG. 9 is a diagram illustrating segmentation of an airframe component into segments of a uniform width in an illustrative embodiment.
Figure 10:
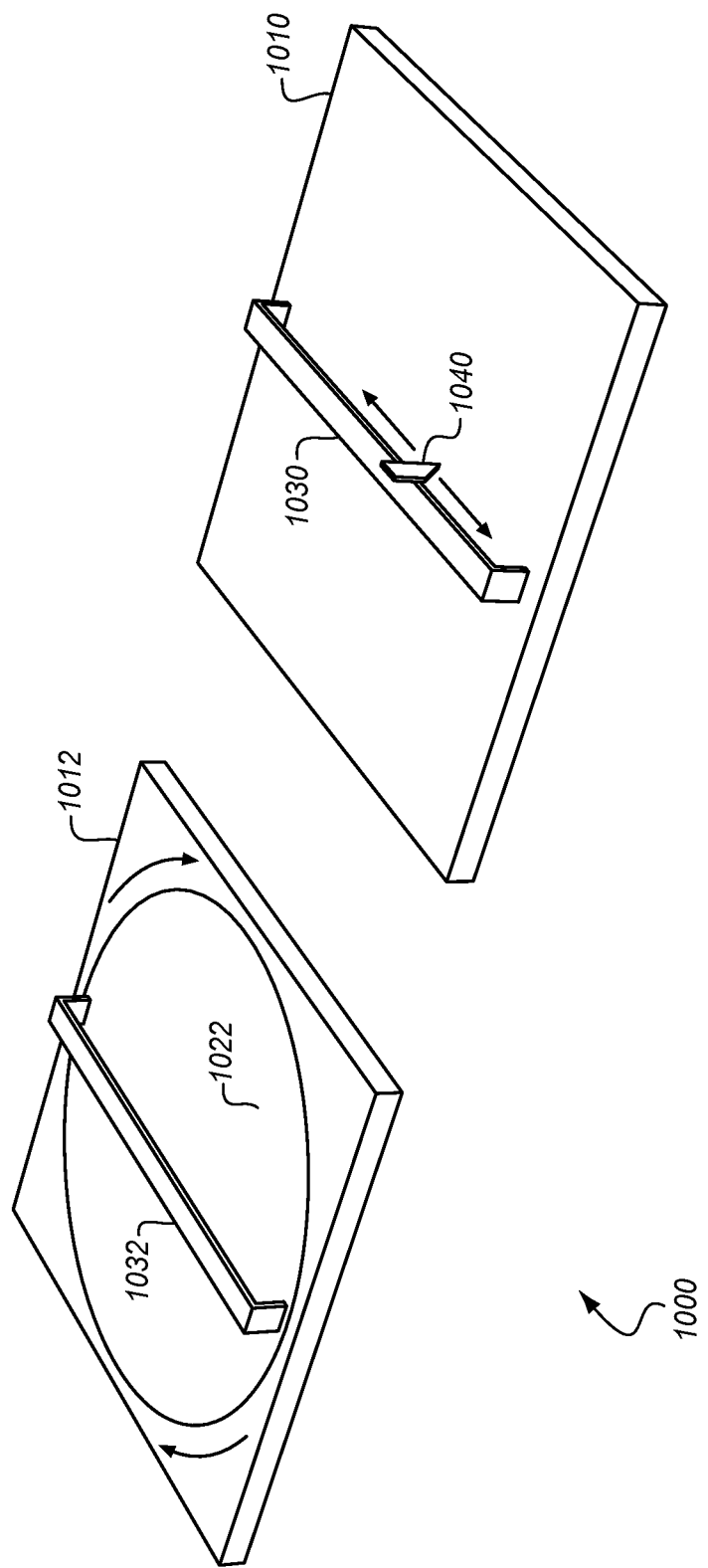
FIGS. 10-13 are diagrams depicting cutting stations that trim a sheet of broad goods into a desired shape for a layup piece in an illustrative embodiment.

FIG. 9 is a diagram illustrating segmentation of an airframe component into segments of a uniform width in an illustrative embodiment. In this embodiment, the airframe component comprises a wing skin 900. The wing skin 900 is subdivided into zones 902-2 through 902-5 cut from broad goods of a uniform width W. A final zone 904 for a small layup piece and a first zone 901 for another layup piece have been trimmed/cut multiple times from the broad goods to reach desired dimensions. In this instance, W corresponds with a width of a sheet of broad goods material.

FIGS. 10-13 are diagrams depicting a broad goods station 1000. Broad goods station 1000 is an example of broad goods station 110 in FIG. 1-7. The broad goods station 1000 includes cutting stations that trim/cut a sheet 118 of broad goods into a desired shape for a layup piece in an illustrative embodiment. In this embodiment, a first cutting station 1012 includes a rotary element 1022, onto which a cutter 1032 is mounted. The rotary element 1022 may be implemented with a slick surface that prevents twisting, wrinkling, and/or bunching of the sheet 118. The cutter 1032 is aligned to make cuts at a single desired angle, and makes a straight cut through a sheet 118 of broad goods material. The cutter 1032 is therefore long enough to accommodate the desired angle of cutting. Second cutting station 1010 operates a cutter 1040 to perform a second cut. A second cutting station 1010 includes a rail 1030 upon which a cutter 1040 moves back and forth.

Figure 11:
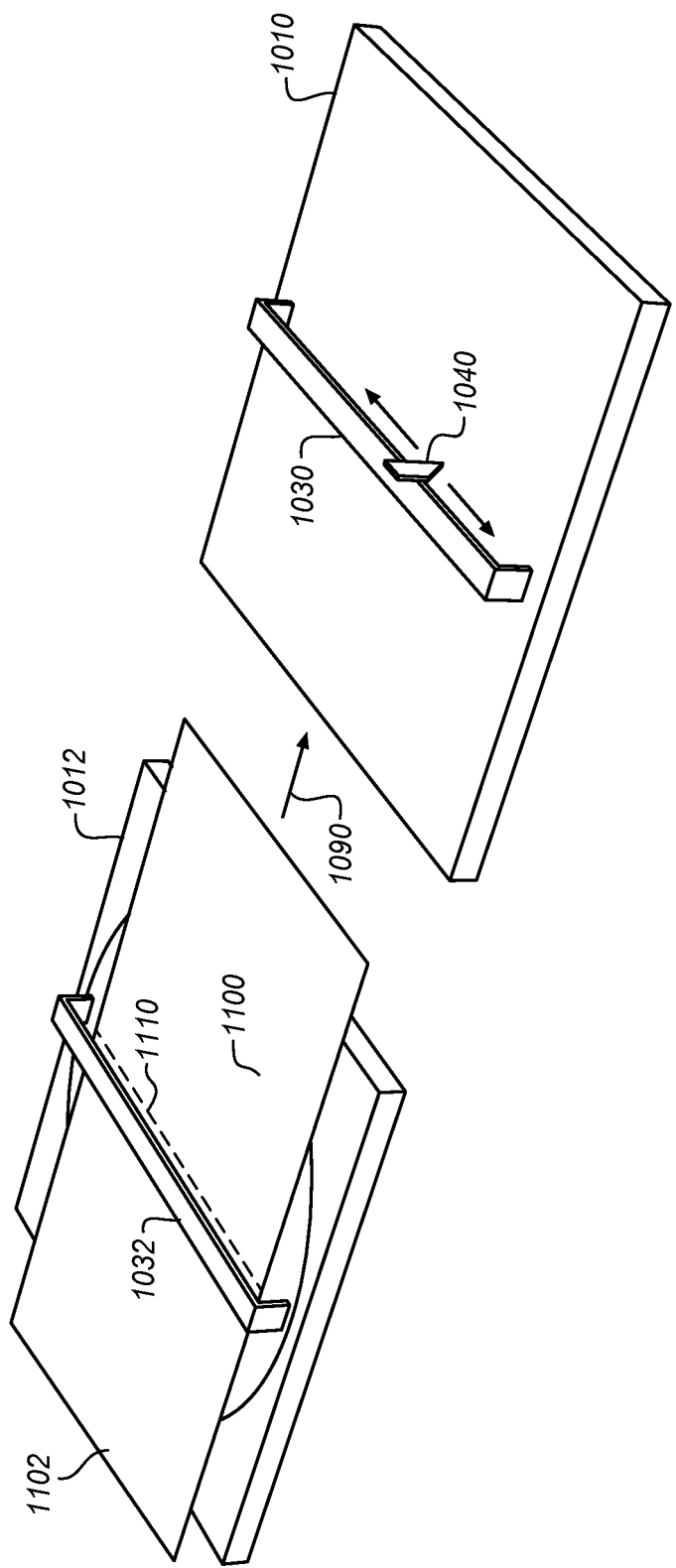
Figure 12:
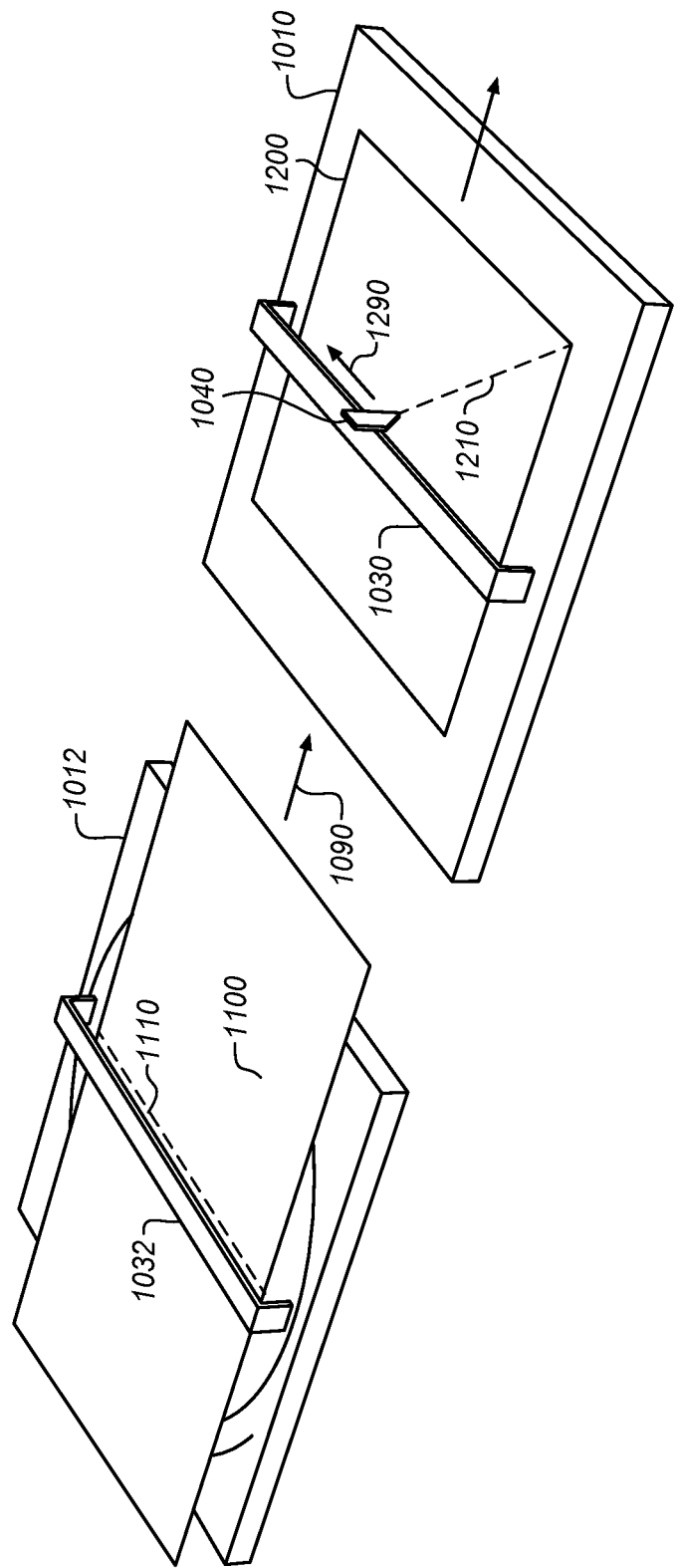
Figure 13:
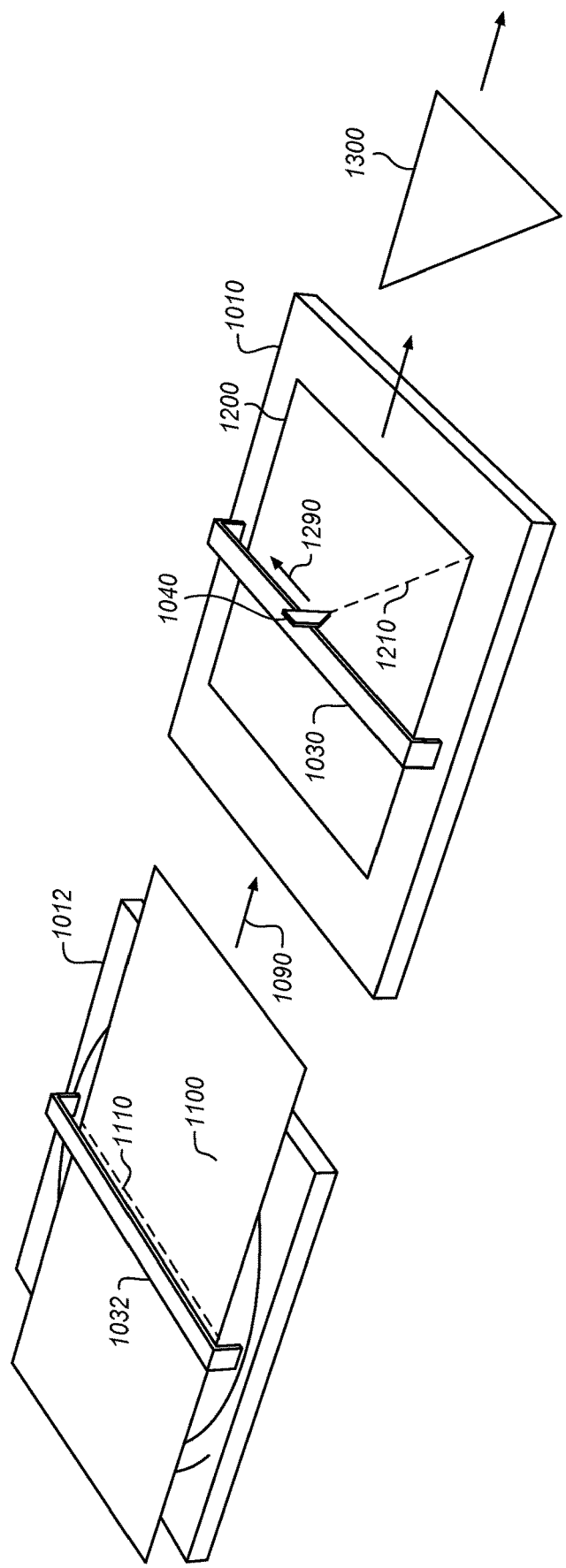

In FIG. 11, a sheet 1100 of broad goods material 1102 advances through first cutting station 1012 in a direction 1090, and cutter 1032 makes a first cut 1110. In FIG. 12, an additional sheet 1100 is fed to the first cutting station 1012, which makes an additional first cut 1110 (which may or may not be at the same angle as the previous first cut, depending on design considerations). Second cutting station 1010 slides cutter 1040 along rail 1030 in direction 1290 during motion of the sheet 1100 in direction 1090, which results in an angled cut 1210 at the layup piece 1200. In further embodiments, additional cutting operations are performed to generated polygonal layup pieces having any number of desired sides and angles. This results in a new layup piece 1300 depicted in FIG. 13.

Figure 14:
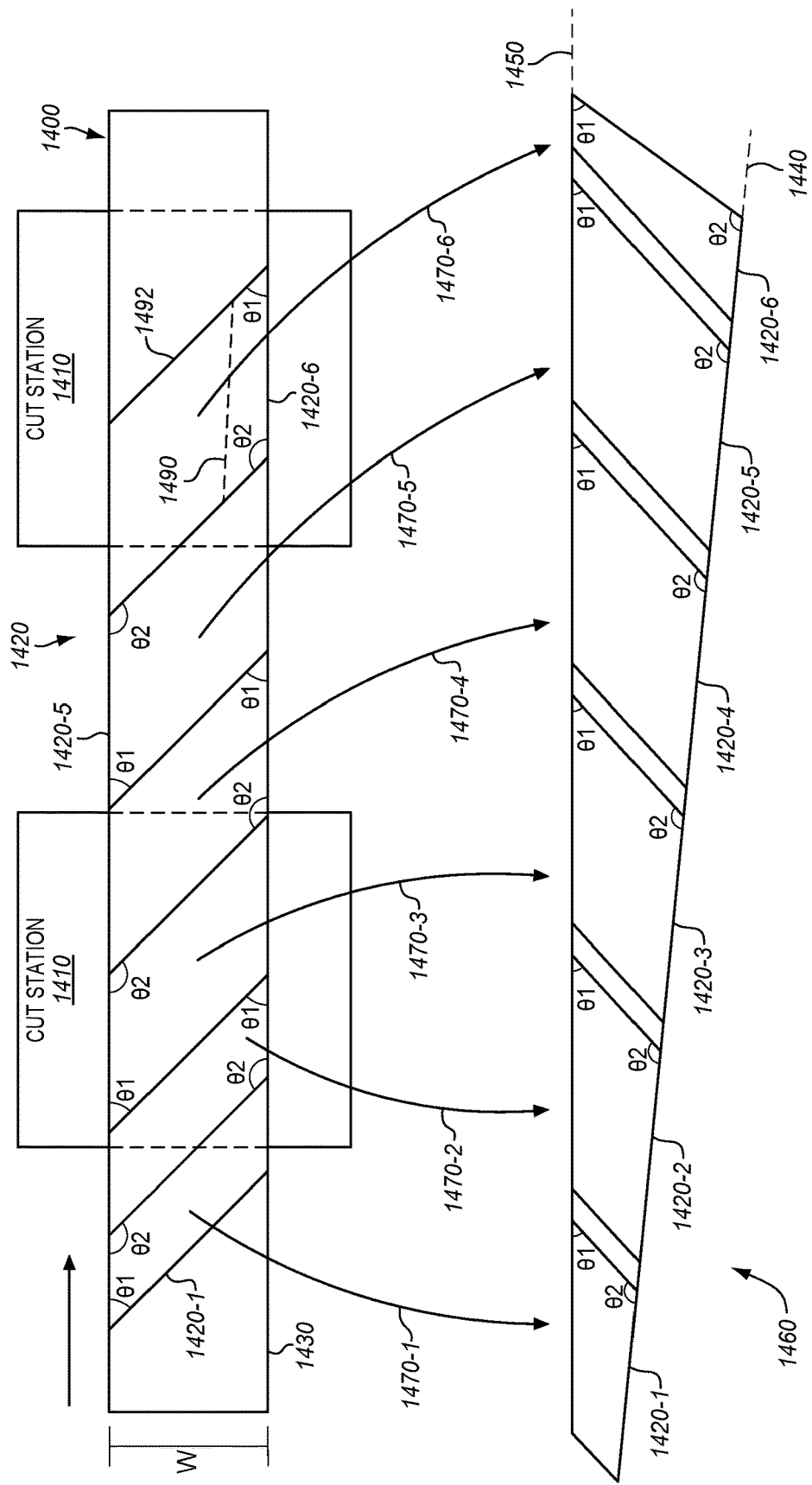
FIG. 14 depicts layup pieces arranged for cutting out from a sheet of broad goods in an illustrative embodiment.

FIG. 14 depicts layup pieces 1420-1 through 1420-6 (referred to collectively or individually as "layup pieces 1420") that are arranged on a surface 1430 for cutting out from a sheet 1400 of broad goods in an illustrative embodiment. In this embodiment, each layup piece 1420 is cut to exhibit leading edge angle θ1 and a trailing edge angle θ2, and each layup piece 1420 is cut from the same sheet (or a same-width sheet) of fiber reinforced broad goods. Some of the layup pieces 1420 receive an additional cut 1490 in order to achieve a desired size. Furthermore, while not shown, the layup pieces 1420 are cut in a flat pattern wherein the layup pieces 1420 butt against and adjoin to layup pieces 1420, and flat patterns are stacked onto a mandrel (e.g., having a complex contour) in order to arrive at a complex shape. That is, the layup pieces 1420 are trimmed in a manner that facilitates the layup piece 1420 conforming to a complex contour from a flat pattern, while still butting against an adjoined layup piece 1420 to facilitate splicing. After the layup pieces 1420 are cut via cut stations 1410, they are seamlessly transported and aligned/rotated into a layup pattern 1460 having a uniform trailing edge 1440 and leading edge 1450 (as indicated by arrows 1470-1 through 1470-6), and are butted up against neighboring pieces. This butting operation is part of splicing when the butting is staggered from ply 175 to ply 175 through a stack up (i.e., through the layers of a preform 194).

Scrap 1492 may be recycled or discarded as desired, or used at other locations as another layup piece 1420 at another location. In this depiction, the layup pattern 1460 is depicted in an exploded view for ease of illustration. Layup pieces 1420 are mirrored horizontally and vertically with respect to adjacent pieces, or arranged at one hundred and eighty degrees relative to each other to enable a common cut angle to be achieved between pieces. That is, a cut according to angle θ2 for one piece also cuts a neighboring piece at the angle θ2. In a further embodiment, one layup piece 1420 fits into a right or upper panel layout and another layup piece 1420 fits into a left or lower panel layout. These arrangements may provide particular benefits in systems wherein stations are specialized for a specific size and/or orientation of layup piece 1420, and deliver roughly similar layup pieces for each wing skin. A system like this may also be implemented for a setup with multiple layup positions around a looped, "S" shaped or "C" shaped assembly line (e.g. systems of FIG. 7A through 7D).

Figure 15:
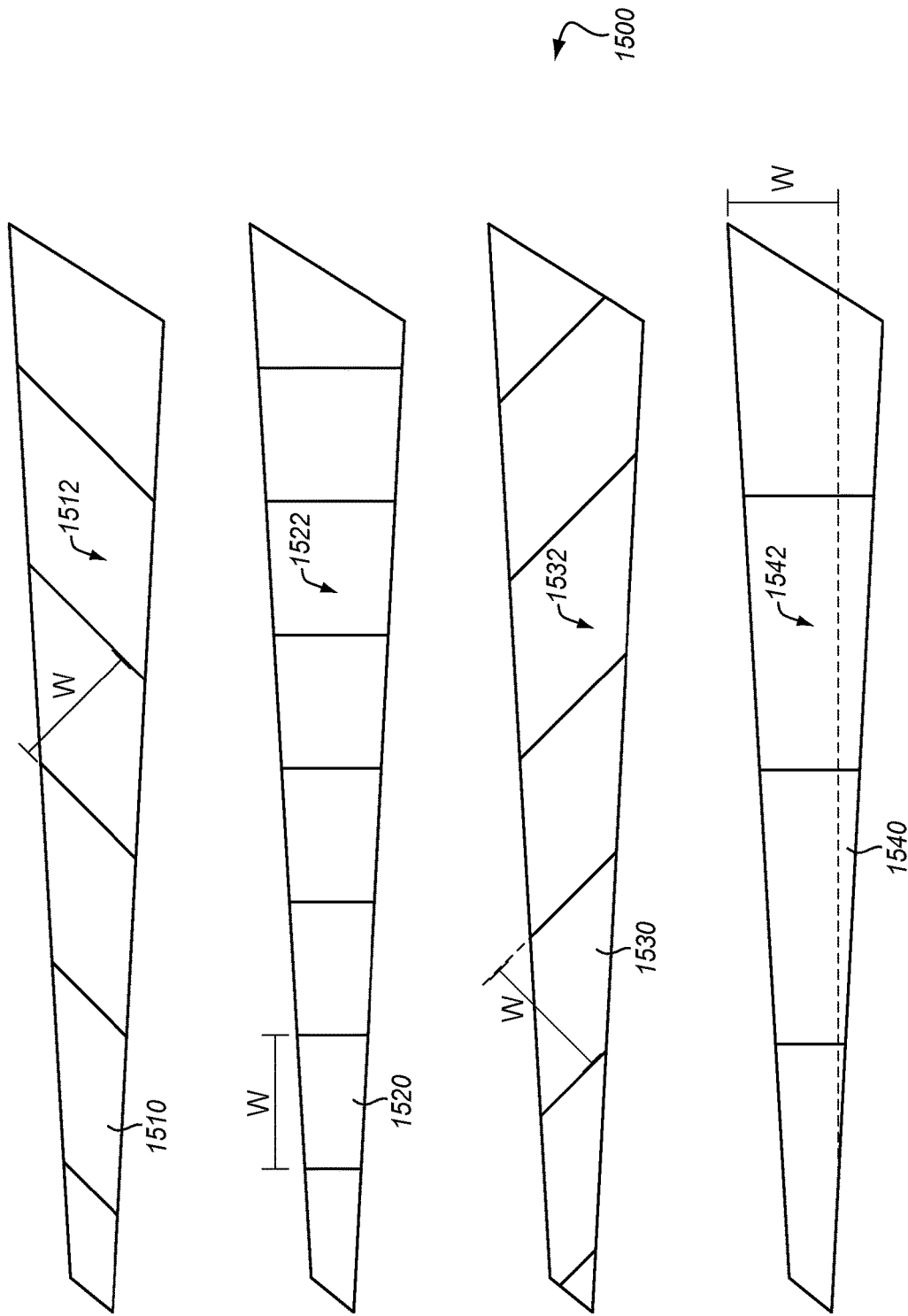
FIG. 15 depicts a series of layup patterns formed from layup pieces in an illustrative embodiment.

FIG. 15 depicts a series of layup patterns formed from layup pieces in an illustrative embodiment. Layup pattern 1510 exhibits a +45° fiber orientation 1512, layup pattern 1520 exhibits a 90° fiber orientation 1522, layup pattern 1530 exhibits a −45° fiber orientation 1532, and layup pattern 1540 exhibits a 0° fiber orientation 1542 for the same wing skin preform 1500. In each of 1510, 1520, 1530, and 1540, fiber orientations are referenced with respect to orientation of broad good sheet (e.g. 118, 1100 or 1400) of width W. By utilizing different fiber orientations for different layers of the wing skin, a desired level of structural strength is achieved.

Figure 16:
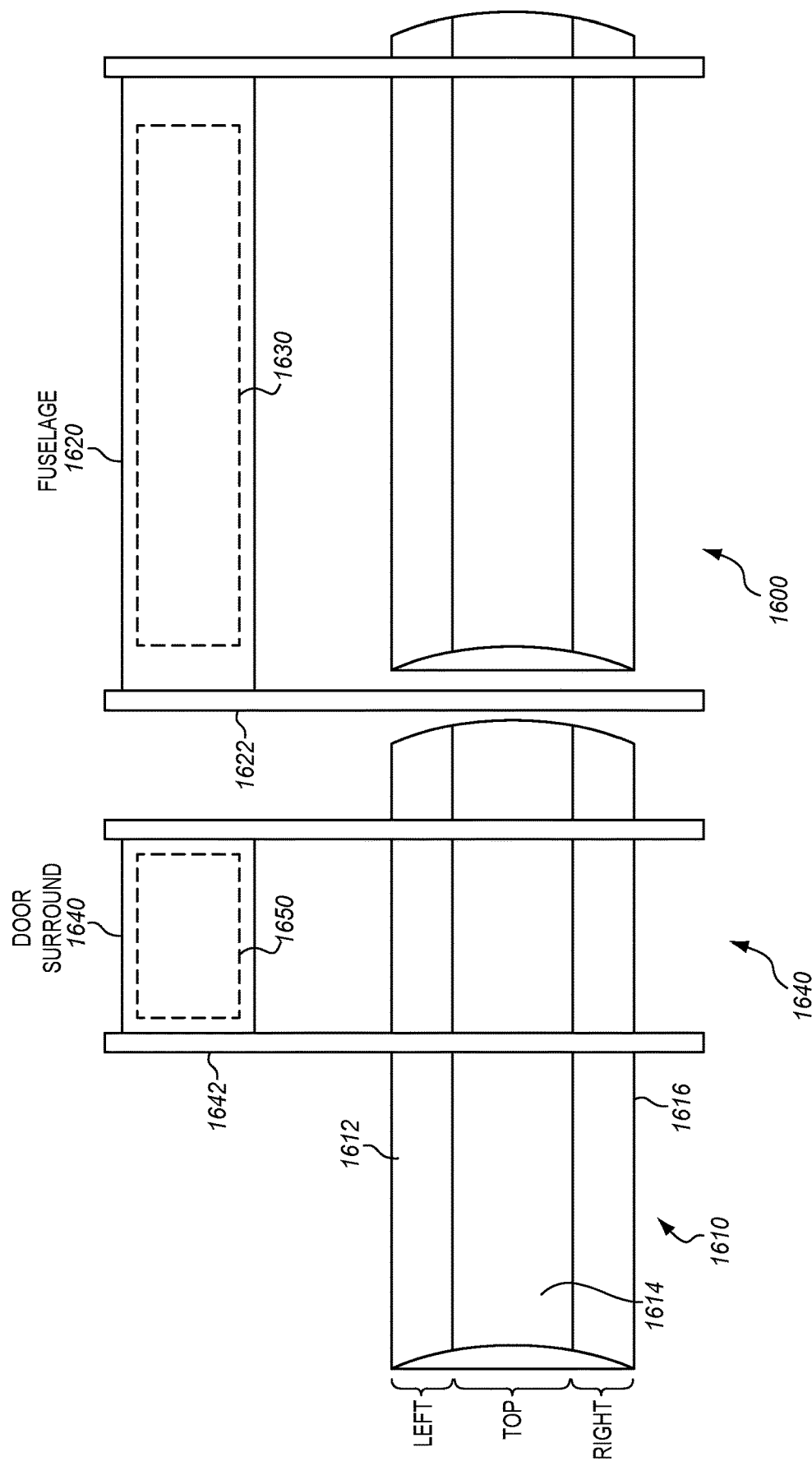
FIG. 16 depicts a Pick and Place (PNP) station that places multiple layup patterns onto different circumferential portions of a layup mandrel for a half-barrel section of fuselage skin in an illustrative embodiment.

FIG. 16 is a top view that depicts a PNP station 1600 that places multiple layup patterns onto different circumferential portions of a layup mandrel 1610 for a half-barrel section of fuselage skin in an illustrative embodiment. While the foregoing figures depict wings, flaps, stabilizers, etc., similar systems may be utilized for a fuselage, nacelle, door, or other structural component of an aircraft. Thus, FIG. 16 depicts one of many possible broad goods PNP techniques for zonal lamination of arcuate sections of fuselage skin. In this embodiment, a carrier 1620 moves along a frame 1622. The carrier 1620 utilizes vacuum coupling to hold a layup pattern 1630 of layup pieces. The carrier 1620 picks and places, then compacts, a single zone during a single PNP operation. For example, the carrier 1620 first picks and places a layup pattern 1630 for a left zone 1612 of the layup mandrel 1610, then picks and places a layup pattern 1630 for a top zone 1614 of the layup mandrel 1610, then picks and places a layup pattern 1630 for a right zone 1616 of the layup mandrel 1610. By iteratively performing these operations and staggering the position of layup patterns 1630 (i.e., the position where the patterns butt up against each other), with respect to layup patterns in other layers of the fuselage skin, the resulting fuselage skin exhibits a desired structural strength. In particular, for layup patterns exhibiting a +/−45° or 90° fiber orientation, and even for layup patterns of the same orientation that are placed over each other, the layup patterns are designed such that the boundaries of layup pieces in different layers overlap each other or form butt splices. In further embodiments, the PNP station 1600 places door surrounds or similar pad-ups onto place at a fuselage or wing skin, using the techniques discussed above. For example, a PNP station 1640 for door surrounds is also depicted in FIG. 16. The PNP station 1640 includes a carrier 1642, which moves along a frame 1622. A layup pattern 1650 (or ply pack, or other component) for the door surround is held at the carrier, for placement onto a zone of the layup mandrel 1610.

Figure 17:
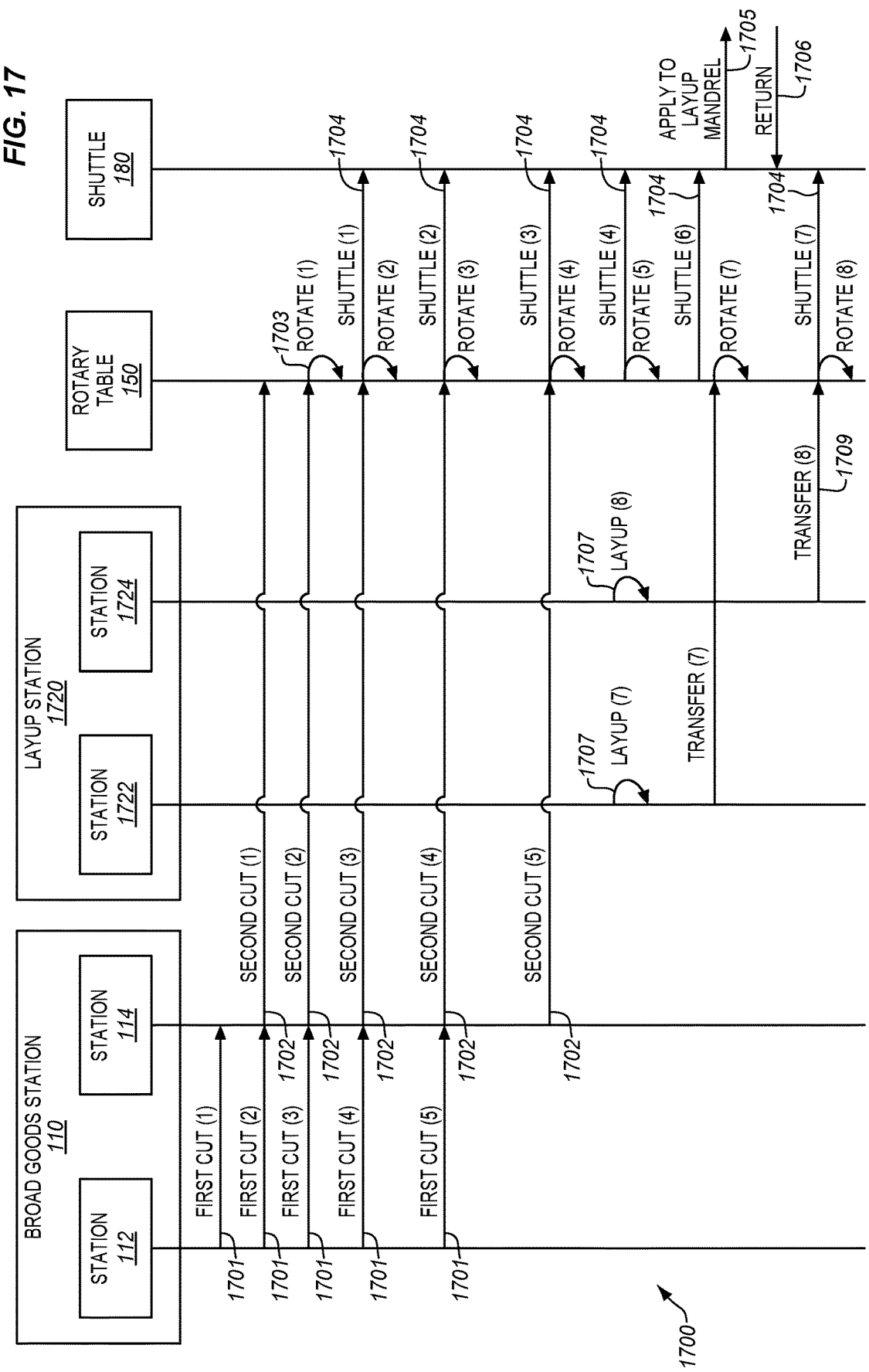
FIG. 17 is a diagram illustrating synchronized operations at an assembly line in an illustrative embodiment.

FIG. 17 is a flow diagram 1700 illustrating synchronized operations at an assembly line in an illustrative embodiment. FIG. 17 illustrates that trims/cuts can be synchronized across stations, such that trimming/cutting operations, rotation at a rotary table, and movement of a shuttle is coordinated to a takt time (e.g., a desired production time for a wing skin or fuselage skin), and the stations perform work synchronously. For example, a first cut 1701 may be applied at a first cutting station 112 while a second cutting station 114 is applying a second cut 1702. Further operations, such as rotation 1703, and transportation via a shuttle 1704, may also be performed while the first cut 1701 and second cut 1702 are being performed. In a similar fashion, a station 1722 of a layup station 1720 may perform layup 1707, and a station 1724 may perform layup 1707 at the same time upon different layup pieces. Further operations, such as applying a layup to a mandrel 1705, returning a mandrel 1706, and/or transferring a layup piece to a shuttle 1709, may also be performed in a synchronized fashion. That is, the trimming/cutting operations, movement of the shuttle, rotation of the rotary table, etc., may occur during a pause between pulses of a sheet of broad goods that is pulsingly advanced from a roll of broad goods. In one embodiment, a pulse and accompanying pause occupy several seconds of time. This insight increases work density and throughput while also ensuring that each station does not interfere with the operations of others.

Figure 18:
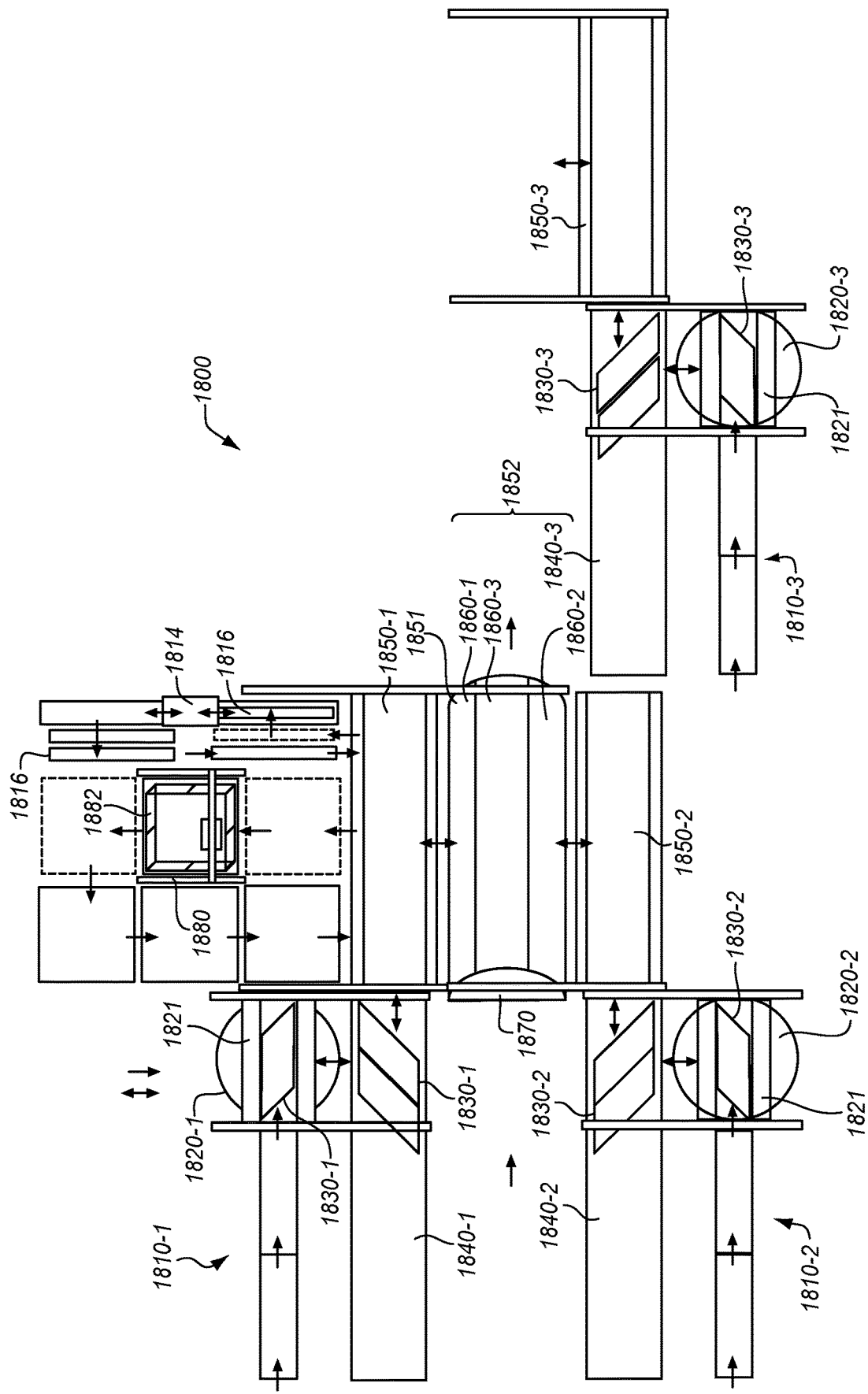
FIG. 18 depicts an assembly line for fuselage section preforms in an illustrative embodiment.

FIG. 18 depicts an assembly line 1800 for fuselage section preforms in an illustrative embodiment. Assembly line 1800 includes broad goods lines 1810-1 through 1810-3, which trim/cut out layup pieces 1830-1 through 1830-3 for placement into a layup pattern 1851 for a fuselage skin 1852. The broad goods lines 1810-1 through 1810-3 include rotary tables 1820-1 through 1820-3. The rotary tables 1820-1 through 1820-3 rotate layup pieces 1830-1 through 1830-3 into a desired alignment, and carriers 1821 apply layup pieces 1830-1 through 1830-3 to conveyors 1840-1 through 1840-3. The layup pieces form layup patterns which are transferred via carriers 1850-1 through 1850-3 to zones 1860-1 through 1860-3 of layup mandrel 1870 as layup pattern 1851. A door surround station 1880 fabricates preforms 1882 for door surrounds for application to the layup mandrel 1870 via the carrier 1850-1. The preforms 1882 are fabricated from preforms 1816 of fiber reinforced material that are laid-up at lamination stations 1814. System 1800 may also be suitable for placement onto layup mandrel 1870 of a length greater than that of the carriers 850-1 through 1850-3. In such a situation, layup mandrel 870 may be transferred lateral to allow for multiple placements of layup pieces (116) 1830-1 through 1830-3 in each of zones 1860-1 through 1860-3.

In the following examples, additional processes, systems, and methods are described in the context of an assembly line for fabricating composite parts from broad goods.

Figure 19:
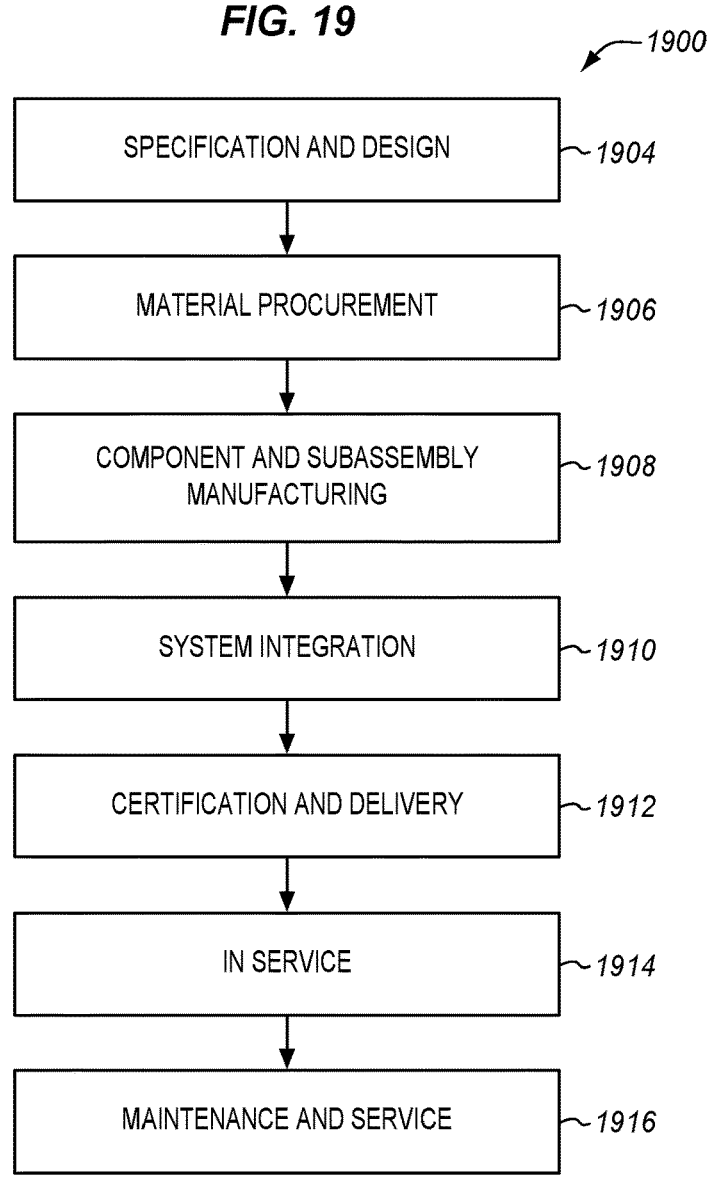
FIG. 19 is a flow diagram of an aircraft production and service methodology in an illustrative embodiment.
Figure 20:
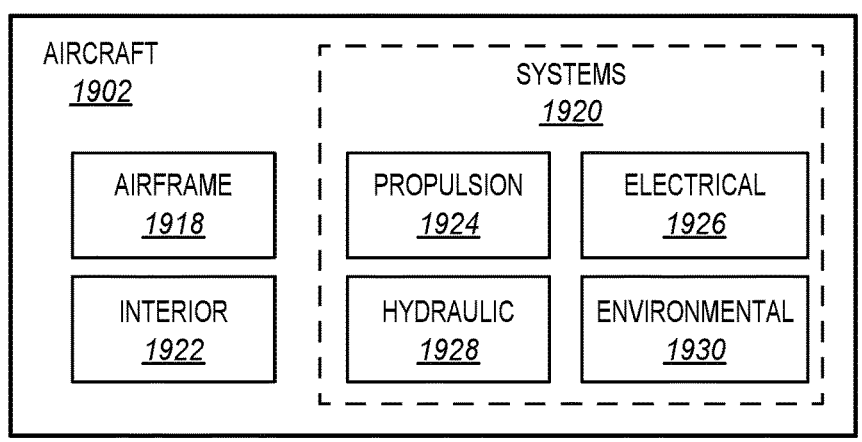
FIG. 20 is a block diagram of an aircraft in an illustrative embodiment.

Referring more particularly to the drawings, embodiments of the disclosure may be described in the context of aircraft manufacturing and service in method 1900 as shown in FIG. 19 and an aircraft 1902 as shown in FIG. 20. During pre-production, method 1900 may include specification and design 1904 of the aircraft 1902 and material procurement 1906. During production, component and subassembly manufacturing 1908 and system integration 1910 of the aircraft 1902 takes place. Thereafter, the aircraft 1902 may go through certification and delivery 1912 in order to be placed in service 1914. While in service by a customer, the aircraft 1902 is scheduled for routine work in maintenance and service 1916 (which may also include modification, reconfiguration, refurbishment, and so on). Apparatus and methods embodied herein may be employed during any one or more suitable stages of the production and service described in method 1900 (e.g., specification and design 1904, material procurement 1906, component and subassembly manufacturing 1908, system integration 1910, certification and delivery 1912, in service 1914, maintenance and service 1916) and/or any suitable component of aircraft 1902 (e.g., airframe 1918, systems 1920, interior 1922, propulsion system 1924, electrical system 1926, hydraulic system 1928, environmental 1930).

Each of the processes of method 1900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 20, the aircraft 1902 produced by method 1900 may include an airframe 1918 with a plurality of systems 1920 and an interior 1922. Examples of systems 1920 include one or more of a propulsion system 1924, an electrical system 1926, a hydraulic system 1928, and an environmental system 1930. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1900. For example, components or subassemblies corresponding to component and subassembly manufacturing 1908 may be fabricated or manufactured in a manner similar to components or subassemblies produced while the aircraft 1902 is in service. Also, one or more apparatus embodiments, method embodiments, or a combination thereof may be utilized during the subassembly manufacturing 1908 and system integration 1910, for example, by substantially expediting assembly of or reducing the cost of an aircraft 1902. Similarly, one or more of apparatus embodiments, method embodiments, or a combination thereof may be utilized while the aircraft 1902 is in service, for example and without limitation during the maintenance and service 1916. Thus, the invention may be used in any stages discussed herein, or any combination thereof, such as specification and design 1904, material procurement 1906, component and subassembly manufacturing 1908, system integration 1910, certification and delivery 1912, in service 1914, maintenance and service 1916 and/or any suitable component of aircraft 1902 (e.g., airframe 1918, systems 1920, interior 1922, propulsion system 1924, electrical system 1926, hydraulic system 1928, and/or environmental 1930).

In one embodiment, a part comprises a portion of airframe 1918, and is manufactured during component and subassembly manufacturing 1908. The part may then be assembled into an aircraft in system integration 1910, and then be utilized in service 1914 until wear renders the part unusable. Then, in maintenance and service 1916, the part may be discarded and replaced with a newly manufactured part. Inventive components and methods may be utilized throughout component and subassembly manufacturing 1908 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for fabricating a preform for a portion of an aircraft, the method comprising:
    acquiring a sheet of broad good fiber reinforced material;
    trimming, at a broad goods station, the sheet by applying a straight cut across an entire width of the sheet at an angle corresponding to a leading edge angle for a wing skin and a trailing edge angle for the wing skin to form layup pieces having boundaries;
    cutting, at a small-piece station, a set of small-piece layup pieces from a roll of broad goods material;
    fabricating, at a tow-piece station, a set of tow-piece layup pieces from fiber reinforced material stored on rolls, wherein fabricating comprises cutting to length and kitting;
    placing the boundaries into alignment by rotating the layup pieces using a rotary table;
    arranging the layup pieces having boundaries, the set of small-piece layup pieces, and the set of tow-piece layup pieces in a layup pattern to form a ply;
    performing a placement operation that transports the layup pattern onto a layup mandrel comprising forming staggered from ply to ply splices between layup pieces of the layup pattern and layup pieces of another layup pattern disposed at the layup mandrel; and
    shaping the layup pattern into conformance with a contour of the layup mandrel,
    wherein trimming the sheet results in the layup pieces having boundaries exhibiting a shared leading edge angle and shared trailing edge angle and having boundaries that are complementary to each other.

2. The method of claim 1 wherein:
    while arranged in the layup pattern the layup pieces are butted against each other.

3. The method of claim 2 wherein:
    placing the boundaries into alignment comprises rotating the layup pieces using the rotary table by orienting leading edges of the layup pieces to a common angle.

4. The method of claim 2 wherein:
    placing the boundaries into alignment comprises rotating the layup pieces using the rotary table by orienting trailing edges of the layup pieces to a common angle.

5. The method of claim 1 wherein:
    the layup pattern forms a ply for the wing skin.

6. The method of claim 1 wherein:
    shaping the layup pattern comprises applying vacuum to the layup pattern via a carrier while performing the placing operation.

7. The method of claim 1 wherein:
    arranging the layup pieces into the layup pattern comprises arranging the layup pieces into a shape of at least one ply for the wing skin.

8. The method of claim 1, wherein the layup pattern is a first layup pattern and further comprising:
    arranging an additional layup pattern onto the first layup pattern prior to performing the placement operation.

9. The method of claim 1 further comprising:
    iteratively trimming, placing, arranging, performing, and shaping until a preform is completed at the layup mandrel.

10. The method of claim 1 wherein:
    shaping the layup pattern is performed by a carrier for performing the placement operation.

11. The method of claim 1, further comprising:
    placing pad-ups onto the layup mandrel such that they do not intersect the staggered from ply to ply splices.

12. A method for fabricating a preform for a composite structure of an aircraft, the method comprising:
    dividing a wing skin into zones;
    fabricating, at a broad goods station, a layup piece for each of the zones by applying a straight cut across an entire width of a sheet of broad good fiber reinforced material at an angle corresponding to a leading edge angle for the wing skin and a trailing edge angle for the wing skin;
    cutting, at a small-piece station, a set of small-piece layup pieces from a roll of broad goods material;
    fabricating, at a tow-piece station, a set of tow-piece layup pieces from fiber reinforced material stored on rolls, wherein fabricating comprises cutting to length and kitting;
    arranging the layup piece for each of the zones, the set of small-piece layup pieces, and the set of tow-piece layup pieces into a layup pattern to form a ply;
    transporting the layup pattern to a layup mandrel via a carrier;
    disposing edges of the layup pattern onto the layup mandrel such that the edges are staggered from ply to ply with respect to other layup patterns for the layup mandrel; and
    compacting the layup pattern onto the layup mandrel,
    wherein applying a straight cut across the entire width of the sheet of broad good fiber reinforced material results in the layup pieces for each of the zones exhibiting a shared leading edge angle and shared trailing edge angle and having boundaries that are complementary to each other.

13. The method of claim 12, wherein:
transporting the layup pattern comprises operating a Pick and Place (PNP) station.

14. The method of claim 12, wherein:
arranging the layup pieces into the layup pattern comprises arranging the layup pieces into a shape of the wing skin.

15. The method of claim 12, wherein the layup pattern is a first layup pattern and further comprising:
compacting an additional layup pattern onto the first layup pattern.

16. The method of claim 15 wherein:
the additional layup pattern forms staggered from ply to ply splices with the first layup pattern.

17. The method of claim 12 further comprising:
iteratively performing dividing, fabricating, arranging, transporting, and compacting until a preform is completed at the layup mandrel.

18. The method of claim 12, further comprising:
placing pad-ups onto the layup mandrel such that they do not intersect the staggered from ply to ply splices.

19. A method for fabricating a preform for a portion of an aircraft, the method comprising:
acquiring a sheet of broad good fiber reinforced material;
trimming, at a broad goods station, the sheet by applying straight cuts across an entire width of the sheet at angles corresponding to a leading edge angle for a wing skin and a trailing edge angle for the wing skin to form layup pieces exhibiting a shared leading edge angle and shared trailing edge angle and having boundaries that are complementary to each other;
cutting, at a small-piece station, a set of small-piece layup pieces from a roll of broad goods material;
fabricating, at a tow-piece station, a set of tow-piece layup pieces from fiber reinforced material stored on rolls, wherein fabricating comprises cutting to length and kitting;
placing the boundaries into alignment by rotating the layup pieces to orient the leading edges or the trailing edges of the layup pieces to a common angle;
arranging the layup pieces exhibiting a shared leading edge angle and shared trailing edge angle and having boundaries that are complementary to each other, the set of small-piece layup pieces, and the set of tow-piece layup pieces in a layup pattern to form a ply for the wing skin, wherein each layup piece exhibiting a shared leading edge angle and shared trailing edge angle and having boundaries that are complementary to each other occupies a zone of the layup pattern, and while arranged in the layup pattern the layup pieces exhibiting a shared leading edge angle and shared trailing edge angle and having boundaries that are complementary to each other are butted against each other;
performing a placement operation in a manner that transports the layup pattern onto a layup mandrel forming staggered from ply to ply splices between the layup pieces of the layup pattern and other layup pieces of another layup pattern disposed at the layup mandrel;
shaping the layup pattern into conformance with a contour of the layup mandrel by applying vacuum to the layup pattern via a carrier while performing the placing operation; and
iteratively trimming, placing, arranging, performing, and shaping until a preform is completed at the layup mandrel;
wherein the operations of acquiring, trimming, placing, arranging, performing, and shaping are performed via stations of an assembly line that operate synchronously in a pulsed fashion; and
wherein the operations of acquiring, trimming, placing, arranging, performing, and shaping are performed according to a takt time.

20. The method of claim 19, further comprising:
placing pad-ups onto the layup mandrel such that they do not intersect the staggered from ply to ply splices.

* * * * *